(12) United States Patent
Yousefi

(10) Patent No.: US 8,259,007 B2
(45) Date of Patent: Sep. 4, 2012

(54) CELL CLUSTERING AND OPTIMIZATION FOR SPACE PARTITIONING

(75) Inventor: Arash Yousefi, Herndon, VA (US)

(73) Assignee: Metron Aviation, Inc., Dulles, VA (US)

( * ) Notice: Subject to any disclaimer, the term of this patent is extended or adjusted under 35 U.S.C. 154(b) by 273 days.

(21) Appl. No.: 12/836,990

(22) Filed: Jul. 15, 2010

(65) Prior Publication Data

US 2011/0095941 A1 Apr. 28, 2011

Related U.S. Application Data

(60) Provisional application No. 61/254,952, filed on Oct. 26, 2009.

(51) Int. Cl.
*G01S 13/00* (2006.01)
(52) U.S. Cl. ............... 342/195; 342/36; 342/180
(58) Field of Classification Search .......... 342/195, 342/29, 36, 179, 180
See application file for complete search history.

(56) References Cited

U.S. PATENT DOCUMENTS

| | | | | |
|---|---|---|---|---|
| 5,774,133 | A * | 6/1998 | Neave et al. | 345/505 |
| 6,437,737 | B1 * | 8/2002 | Azzarelli et al. | 342/360 |
| 6,937,245 | B1 * | 8/2005 | Van Hook et al. | 345/546 |
| 7,830,392 | B1 * | 11/2010 | Danskin et al. | 345/544 |
| 7,898,520 | B2 * | 3/2011 | Freier | 345/102 |
| 7,974,478 | B2 * | 7/2011 | Bashyam et al. | 382/232 |
| 2002/0147572 | A1 * | 10/2002 | Wallet et al. | 703/2 |
| 2004/0155881 | A1 * | 8/2004 | Kotani et al. | 345/441 |
| 2007/0159488 | A1 * | 7/2007 | Danskin et al. | 345/505 |
| 2011/0025682 | A1 * | 2/2011 | Keller et al. | 345/418 |
| 2011/0064302 | A1 * | 3/2011 | Ma et al. | 382/159 |
| 2011/0095941 | A1 * | 4/2011 | Yousefi | 342/179 |

OTHER PUBLICATIONS

Wuescher, D.M.; Boyer, K.L.; , "Robust contour decomposition using a constant curvature criterion ," Pattern Analysis and Machine Intelligence, IEEE Transactions on , vol. 13, No. 1, pp. 41-51, Jan. 1991.*

* cited by examiner

*Primary Examiner* — John B Sotomayor
(74) *Attorney, Agent, or Firm* — Esmael Dinan

(57) ABSTRACT

A partitioning system includes a decomposer module, a supply and cell commonality computation module, a network structure setup module, a seed selection module, an optimization setup module, a solver module, and a boundary creation module. A network structure is created by connecting each cell to each of its neighboring cells using bi-directional arcs. Each bi-directional arc is assigned a flow value and a cell commonality metric. The optimization program is solved to determine the flow value for each bi-directional arc and to determine a plurality of open seeds. Each determined seed represents one partition. Partition boundaries are created by grouping cells when they are connected to each other via one of the updated set of bi-directional arcs into cell clusters. Cells within cell clusters are merged to create the predetermined number of contiguous partitions.

28 Claims, 26 Drawing Sheets

| Low Sector Lookup Table | | | R ratio | | | |
|---|---|---|---|---|---|---|
| Grid Cell Area [NM] | Grid Cell # of Sides | Grid Cell Length (°) | 50th %ile | 80th %ile | 90th %ile | 99th %ile |
| 93.8 | 6 | 0.1 | 0.50 | 0.67 | 0.78 | 1.0 |
| 211.0 | 6 | 0.15 | 0.71 | 0.88 | 1.00 | 1.0 |
| 375.0 | 6 | 0.2 | 0.83 | 1.00 | 1.00 | 1.0 |

| High Sector Lookup Table | | | R ratio | | | |
|---|---|---|---|---|---|---|
| Grid Cell Area [NM] | Grid Cell # of Sides | Grid Cell Length (°) | 50th %ile | 80th %ile | 90th %ile | 99th %ile |
| 93.8 | 6 | 0.1 | 0.40 | 0.52 | 0.61 | 0.9 |
| 211.0 | 6 | 0.15 | 0.57 | 0.72 | 0.86 | 1.0 |
| 375.0 | 6 | 0.2 | 0.73 | 0.88 | 1.00 | 1.0 |
| 585.8 | 6 | 0.25 | 0.8571 | 1 | 1.0 | 1 |
| 843.5 | 6 | 0.3 | 0.9375 | 1 | 1.0 | 1 |

| Superhigh Sector Lookup Table | | | R ratio | | | |
|---|---|---|---|---|---|---|
| Grid Cell Area [NM] | Grid Cell # of Sides | Grid Cell Length (°) | 50th %ile | 80th %ile | 90th %ile | 99th %ile |
| 93.8 | 6 | 0.1 | 0.37 | 0.52 | 0.62 | 0.9 |
| 211.0 | 6 | 0.15 | 0.53 | 0.72 | 0.85 | 1.0 |
| 375.0 | 6 | 0.2 | 0.69 | 0.88 | 1.00 | 1.0 |
| 585.8 | 6 | 0.25 | 0.8 | 1 | 1.0 | 1 |
| 843.5 | 6 | 0.3 | 0.8889 | 1 | 1.0 | 1 |

FIG. 23

CELL CLUSTERING AND OPTIMIZATION FOR SPACE PARTITIONING

CROSS-REFERENCE TO RELATED APPLICATIONS

This application claims the benefit of U.S. Provisional Application No. 61/254,952, filed Oct. 26, 2009, entitled "Grid Optimization Algorithm," which is hereby incorporated by reference in its entirety.

FIELD OF THE INVENTION

The present invention generally relates to the filed of slicing and partitioning a two- or three-dimensional (2-D or 3-D) space into smaller 2- or 3-D spaces given a set of requirements, criteria, or objectives for each partition or slice.

BACKGROUND OF THE INVENTION

Airspace capacity may be limited by the ability of controllers to manage complex traffic patterns. In congested areas of the National Airspace System (NAS), the controller workload limitation is a critical capacity constraint that generates significant en route delay. In response, controllers may apply Miles-in-Trail (MIT) restrictions, reroute aircraft, or deny access into sectors to avoid high workload situations. In today's rigidly structured airspace system, the airspace managers may have very limited flexibility to reconfigure the airspace based on changes in aggregated demand. One dynamic option is to combine two or more sectors. These tactical modifications may not well communicated with the users, and the resulted capacity may be lost. Without effective improvements to reduce the controller workload in congested areas, the airspace may not be able to accommodate future growth in air travel.

Airspace sector design or sectorization has a direct impact on controller workload. A good sectorization could ease the workload even in complex traffic situations. Current airspace sectorization is not based on a comprehensive and system-level study of demand profile and route structure. Sector boundaries have been developed historically, not analytically. Currently, static modifications and airspace redesigns may be conducted within Centers, but the system-wide effect of any change to the entire NAS is not usually considered. Over years, sectors in congested airspaces have been divided into smaller sectors to lower the aircraft density. However, the available radio frequency spectrum for controller-pilot communication may limit the achievable number of sectors in the NAS. This may change in Next Generation Air Transportation System (NextGen) as voice communication between pilots and controllers becomes the exception and not the norm.

Controller workload is directly related to the controller's situational awareness. Structured air traffic may reduce the system dynamics and enable the controller to develop mental abstractions to reduce the cognitive complexity of a traffic situation. This complexity reduction may result in airspace capacity improvement. Current air traffic patterns in the US contain highly structured routes that are favorable for controller workload. However, current airspace sectorization is not entirely in accordance with this structured traffic. Consequently, controllers may not be able to take full advantage of the existing structure. For example, an aircraft destined to Chicago from Los Angeles may cross up to 15 different sectors while en route. Such a non-centralized system may produce a significant amount of controller-to-controller and pilot-to-controller coordination workload, which could make the system inefficient.

It is an object of the present invention to address these limitations, and provide a process to design optimized sector boundaries which reduce controller workload, enhance safety, increase sector throughput, and decrease unnecessary en route delay.

SUMMARY OF THE INVENTION

It is an object of the present invention to provide a partitioning process to slice a 2-D or 3-D space into smaller partitions given some objectives and constraints. A grid-based airspace decomposition process is developed to decompose the airspace into its unit building blocks.

In an embodiment of the present invention, a selected area may be decomposed into cells. A supply value may be computed for each cell. A network structure may be created by connecting each cell to each of its neighboring cells using bi-directional arcs. Each bi-directional arc may be assigned a flow variable that represents a cumulative supply value transferred between adjacent cells for each direction. Furthermore, a commonality value may be assigned to each pair of adjacent cells which represents demand similarities between two adjacent cells.

A subset of the cells may be selected to be a plurality of seeds, and each seed is assigned a demand value. A "seed" represents a potential sink in a flow network.

An optimization process is used to cluster cells into a predetermined number of contiguous partitions. The optimization process may calculate a total demand for each predetermined number of contiguous partitions as the summation of the supply value of cells clustered into each predetermined number of contiguous partitions.

An objective function may be created that prioritizes bi-directional arcs relative to their cell commonality metric.

The optimization process may contain a set of constraints, including the following: a predetermined number of contiguous partitions, applying flow conservation constraints to each cell, limiting the total demand of each partition to be smaller than a predetermined value, restricting only one of the flow values of a subset of the bi-directional arcs connected to each cell to be non-zero, and shape constraints for avoiding highly concave partitions.

The optimization process is solved to determine the flow variable for each bi-directional arc, and to determine a plurality of seeds that may become open and turn to sink nodes. Each open seed then represents one partition. Solving the optimization process also determines the demand for each partition. Partition boundaries may be created for each open seed by creating an updated set of bi-directional arcs, and by eliminating bi-directional arcs whose flow value is determined by the optimization process to be equal to zero. Then, cells may be grouped when they are connected to each other via one of the bi-directional arcs into cell clusters. Cells within cell clusters may be merged to create the predetermined number of contiguous partitions.

Another embodiment of the invention is a partitioning system for dividing a selected area into a predetermined number of contiguous partitions. Each task in the partitioning process may be implemented by a module. A decomposer module may decompose the selected area into a plurality of cells. A metric computation module may compute a supply value for each of said plurality of cells and also compute commonality metrics for pairs of adjacent cells. A network structure setup module may create a network structure by connecting each cell to each of its neighboring cells. A seed selection module may select a subset of the cells to be a plurality of seeds. An optimization setup module may create an optimization process to cluster the cells into a predetermined number of contiguous partitions. A solver module may solve the optimization program. A boundary creation module may create partition boundaries for each of the plurality of open seeds using the solution of the optimization program.

It is additionally an object of the present invention to provide a system and process for partitioning a selected volume into a predetermined number of contiguous 3-D partitions.

BRIEF DESCRIPTION OF THE DRAWINGS

The accompanying drawings, which are incorporated in and form a part of the specification, illustrate embodiments of the present invention and, together with the description, serve to explain the principles of the invention.

FIG. 23 presents examples of lookup tables for ratio R of perimeter-to-area for existing sectors in the NAS.

DETAILED DESCRIPTION OF THE PREFERRED EMBODIMENTS

The objects and features of the present invention become apparent from the following detailed description of the present invention considered in connection with the accompanying drawings which disclose an embodiment of the present invention. It should be understood, however, that drawings, as well as the description, are presented here for the purpose of illustration only and not as a definition of the limits of the invention.

Embodiments of the present invention partition a selected area or volume into a predetermined number of contiguous partitions.

Figure 1:
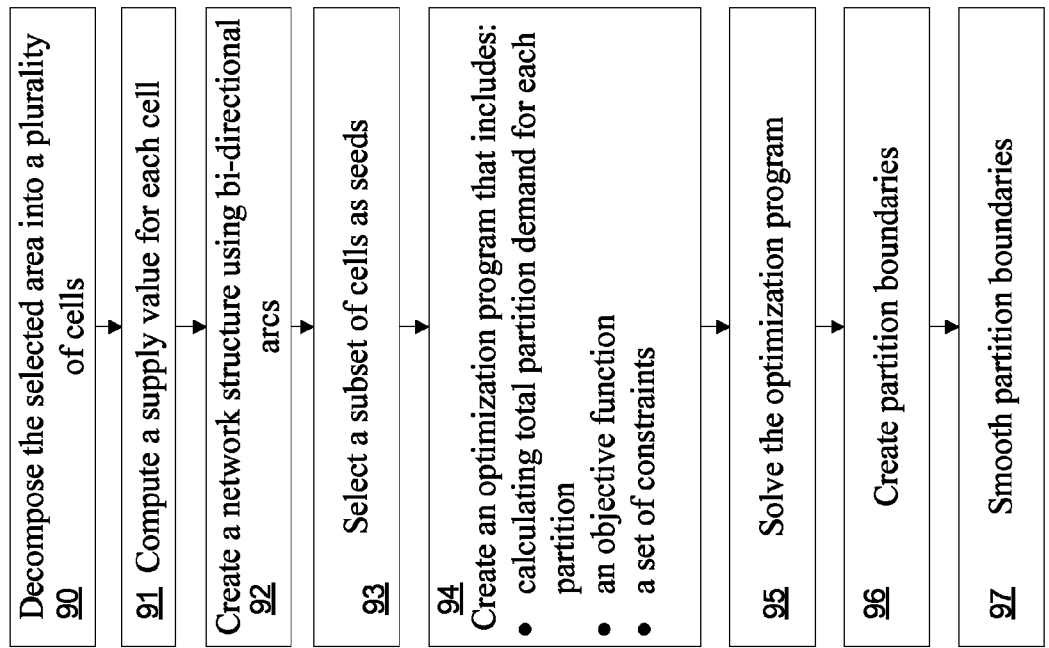
FIG. 1 illustrates an embodiment of the partitioning process.

FIG. 1 illustrates an embodiment of the partitioning process for partitioning a selected area into a predetermined number of contiguous partitions. A selected area may be decomposed into cells in task 90. Many of the cells may be grouped to form larger cells before executing the process for partitioning a selected area.

A supply value may be computed for each cell in task 91. The supply value of each cell may be determined using a cell traffic load, cell traffic complexity, cell workload, cell radar traffic hit, cell population, cell concentration of goods, or a combination of all or some of the above Also commonality metrics can be computed for pairs of adjacent cells based on similarity of traffic direction between adjacent cells or number of aircraft transferred between adjacent cells or any other metric that represents the degree of commonality of adjacent cells, A network structure may be created in task 92 by connecting each cell to each of its neighboring cells using bi-directional arcs. Each bi-directional arc may be assigned a flow variable configured to represent a cumulative supply value transferred between adjacent cells, and a cell commonality metric configured to represent demand similarities between two adjacent cells. The commonality metric may be calculated using the number of vehicles transferred between two adjacent cells connected by bi-directional arcs. The commonality metric may also be calculated using similarity of traffic direction within two adjacent cells connected by bi-directional arcs.

In task 93, a subset of the cells may be selected to be a plurality of seeds, and each seed may be assigned a demand value. Selection of the plurality of seeds may include one of the following methods: selecting each of the cells to be a seed, selecting seeds in a regular grid from the cells, selecting the seeds based on supply value for each cell, selecting seeds based on geographical location of points of interest (i.e. communication towers, Air Traffic Control facilities, etc), or selecting seeds based on a random selection from the cells.

In task 94, an optimization program may be created to cluster cells into predetermined number of contiguous partitions. The optimization program may calculate a total partition demand for each predetermined number of contiguous partitions as the summation of the supply value of cells clustered into each predetermined number of contiguous partitions. An objective function may be created that prioritizes bi-directional arcs relative to their cell commonality metric. The objective function may include the ratio of the flow values to the cell commonality metric summed over all the bi-directional arcs in the network structure.

The optimization program created in task 94 may contain a set of constraints, including creating the predetermined number of contiguous partitions, applying flow conservation constraints to each cell, limiting the total partition demand of each predetermined number of contiguous partitions to be smaller than a predetermined value, and restricting all but one of the flow values of a subset of the bi-directional arcs connected to each cell to be zero. The optimization program may be a mixed integer program. The optimization program may further include a set of constraints for restricting the ratio of perimeter to surface area of each of the predetermined number of contiguous partitions to a predetermined value. For clustering cells in 3-D, the optimization program may also include constraints for clustering 3-D cells into right prism partitions.

The optimization program is solved in task 95 to determine the flow value for each bi-directional arc and to determine a plurality of open seeds. Each determined seed may represent one partition. Solving the optimization program also determines the total partition demand for each of the predetermined number of contiguous partitions.

In task 96, partition boundaries may be created for each open seed by creating an updated set of bi-directional arcs by eliminating bi-directional arcs that their flow value is determined by the optimization program to be equal to zero. Cells may be grouped when they are connected to each other via one of the updated set of bi-directional arcs into cell clusters. Cells within cell clusters may be merged to create the predetermined number of contiguous partitions.

In task 97, boundaries of the computed partitions are smoothed.

Another embodiment of the invention is a partitioning system for partitioning a selected area into a predetermined number of contiguous partitions. Each task in the partitioning process may be implemented by a module. A decomposer module may decompose the selected area into a plurality of cells. A supply computation module may compute a supply value for each of said plurality of cells. A network structure setup module may create a network structure by connecting each cell to each of its neighboring cells. A seed selection module may select a subset of the cells to be a plurality of seeds. An optimization setup module may create an optimization program to cluster the cells into the predetermined number of contiguous partitions. A solver module may solve the optimization program. A boundary creation module may create partition boundaries for each of the plurality of open seeds.

In another embodiment of this invention, the partitioning process can be used to partition a selected volume into a predetermined number of contiguous 3-D partitions.

The selected volume may be decomposed into 3-D cells. Many of the 3-D cells may be grouped to form larger 3-D cells before execution of the process for partitioning a selected volume.

A supply value may be computed for each 3-D cell. The supply value of each 3-dimensional cell may be determined using a 3-D cell traffic load, 3-D cell traffic complexity, 3-D cell workload, 3-D cell radar traffic hit, 3-D cell population, 3-D cell concentration of goods, or a combination of the above. A network structure may be created by connecting each 3-D cell to each of its horizontal or vertical neighboring 3-D cells using bi-directional arcs. Each bi-directional arc may be assigned a flow variable configured to represent the amount of a cumulative supply value transferred between adjacent 3-D cells, and a 3-D cell commonality metric configured to represent demand similarities between two adjacent 3-D cells. The commonality metric may be calculated using the number of vehicles transferred between two adjacent 3-D cells connected by bi-directional arcs. The commonality metric may also be calculated using similarity of traffic direction within two adjacent 3-D cells connected by bi-directional arcs.

A subset of the 3-D cells may be selected to be a plurality of seeds, and each seed is assigned a demand value. Selection of the plurality of seeds may include one of the following methods: selecting each of the 3-D cells to be a seed, selecting seeds in a regular grid from the 3-D cells, selecting the seeds based on supply value for each 3-D cell, selecting seeds based on geographical location of points of interest, or selecting seeds based on a random selection from the 3-D cells.

An optimization program is created to cluster 3-D cells into a predetermined number of contiguous partitions. The optimization program may calculate a total partition demand for each predetermined number of contiguous partitions as the summation of the supply value of 3-D cells clustered into each predetermined number of contiguous partitions. An objective function is created that prioritizes bi-directional arcs relative to their 3-D cell commonality metric. The objective function may include the ratio of the flow values to the 3-D cell commonality metric summed over all the bi-directional arcs in the network structure.

The optimization program may contain a set of constraints, including the following: a predetermined number of contiguous partitions, applying flow conservation constraints to each 3-D cell, limiting the total demand of each partition to be smaller than a predetermined value, and restricting only one of the flow values of a subset of the bi-directional arcs connected to each 3-D cell to be non-zero. The optimization program may also include an additional constraint restricting each of the predetermined number of contiguous 3-D partitions to be a right prism wherein its joining edges and faces are perpendicular to the base faces. The optimization program may be a mixed integer program.

The optimization program is solved to determine the flow value for each bi-directional arc, and to determine a plurality of open seeds. Each determined seed may represent one partition. Solving the optimization program also determines the demand for each partition. Partition boundaries may be created for each open seed by creating an updated set of bi-directional arcs, and by eliminating bi-directional arcs whose flow value is determined by the optimization program to be equal to zero. Then, 3-D cells may be grouped when they are connected to each other via one of the updated set of bi-directional arcs into 3-D cell clusters. 3-D cells within 3-D cell clusters may be merged to create the predetermined number of contiguous partitions. The partitioning process in this embodiment may further include a task for smoothing the boundaries of the predetermined number of contiguous partitions.

Another embodiment of the invention is a system for partitioning a selected volume into a predetermined number of contiguous partitions. Each task in the partitioning process may be implemented by a module. A decomposer module may decompose the selected volume into a plurality of 3-D cells. A supply computation module may compute a supply value for each of said plurality of 3-D cells. A network structure setup module may create a network structure by connecting each 3-D cell to each of its neighboring 3-D cells. A seed selection module may select a subset of the 3-D cells to be a plurality of seeds. An optimization setup module may cluster the 3-D cells into a predetermined number of contiguous partitions. A solver module may solve the optimization program. A boundary creation module may create partition boundaries for each of the plurality of open seeds.

Another embodiment of the invention is a process for partitioning a selected area into a plurality of contiguous partitions comprising many modules. A module may decompose the selected area into a plurality of cells. Another module may create a network structure by connecting each of the plurality of cells to each of its neighboring cells by two directional arcs (the two directional arcs are in opposite directions). Another module may select (for each of the plurality of cells) only one of outward directional arcs connecting each of the plurality of cells to its neighbors based on a set of predetermined criteria. An outward directional arc is an arc with direction outward the cell. Another module may create partition boundaries by: creating an updated plurality of directional arcs by eliminating arcs in the plurality of outward directional arcs that are not selected, grouping cells in the plurality of cells when they are connected to each other via one of the updated plurality of directional arcs into a plurality of cell clusters, and merging cells within each of the plurality of cell clusters to create the plurality of contiguous partitions. Each of the directional arcs may be assigned a cost value. The cost value may be determined based on a cell commonality value configured to represent demand similarities between two adjacent cells. The set of predetermined criteria may be calculated using the cell commonality value of at least one of the directional arcs.

Another embodiment of the invention is a process for partitioning a selected area into a plurality of contiguous partitions comprising many modules. A module may decompose the selected area into a plurality of cells. Another module may create a network structure by connecting each of the plurality of cells to each of its neighboring cells by plurality of arcs. Another module may create partition boundaries by: creating an updated plurality of arcs by eliminating a subset of the plurality of arcs based on a set of predetermined criteria, grouping cells in the plurality of cells when they are connected to each other via one of the updated plurality of arcs into a plurality of cell clusters, and merging cells within each of the plurality of cell clusters to create the plurality of contiguous partitions. Each of the arcs may be assigned a cost value. The cost value may be determined based on a cell commonality value configured to represent demand similarities between two adjacent cells. The set of predetermined criteria may be calculated using the cell commonality value of at least one of the arcs.

In the following, an embodiment of the invention for partitioning the airspace into sectors or Air Route Traffic Control Centers (ARTCCs) is presented. Specifically, a Mixed Integer Program (MIP) is developed. MIPs are models that contain both integer-restricted variables and free variables (fractional values allowed).

Ignoring today's sector boundaries, the airspace is tiled with grid cells of a fixed size and a certain altitude range. For instance, a cell may extend from 24,000 feet altitude (FL240) to 60,000 feet altitude (FL 600). The objective is to cluster the cells into non-overlapping sectors such that workload for Air Traffic Controllers (ATCs) is as uniform as possible over all sectors, thereby eliminating potential bottlenecks in traffic flow. Another objective is to align the boundaries along the major traffic flows so that the sector boundary crossing—and consequently coordination workload between adjacent sectors—is minimized. In principle, cells could be triangle, rectangle, or hexagonal. Hexagonal cells may be preferable because this is the only shape that has common sides (not vertices) with all of its adjacent cells such that clustering cells in every direction in a 2D plane creates a contiguous region. In domains other than airspace, one may desire to balance the amount of sales across market districts or balance number of Democratic or Republican voters across all jurisdictional districts, etc. Similarly, one may desire to reduce or minimize the flow of goods or commodities across adjacent districts or partition a wildlife protected region such that the migration of animals between partitions is minimized.

The MIP may determine an optimal clustering, minimizing deviations from the average workload over all sectors and simultaneously minimizing the number of boundary crossings by flight trajectories. The process receives as input the cells' shape and size, historic or forecasted trajectories, number of partitions (sectors) or total acceptable workload per each sector, and allowable variation of workload among sectors.

Cell workload metrics are chosen based on the results of extensive research on controller workload and traffic complexity. These metrics are fed into the MIP to estimate the workload that would be experienced by air traffic controllers under each feasible airspace partitioning considered by the MIP. Any MIP solver in the market (i.e. CPLEX™ from ILOG-IBM Inc. or XPRESS™ from FICO) may be used to solve the model. The MIP outputs an association of cells relative to each other, which is then translated to an explicit geographical representation of the sector boundaries.

The size of the cells may be chosen based on the desired resolution of the final sector boundary design; smaller cells yield less jagged boundaries but increase the run time of the MIP. By default, the entire U.S. airspace is tiled, but this process may be applied to any contiguous region, such as one or more contiguous ARTCCs or a Terminal Area (TRACON).

Figure 2:
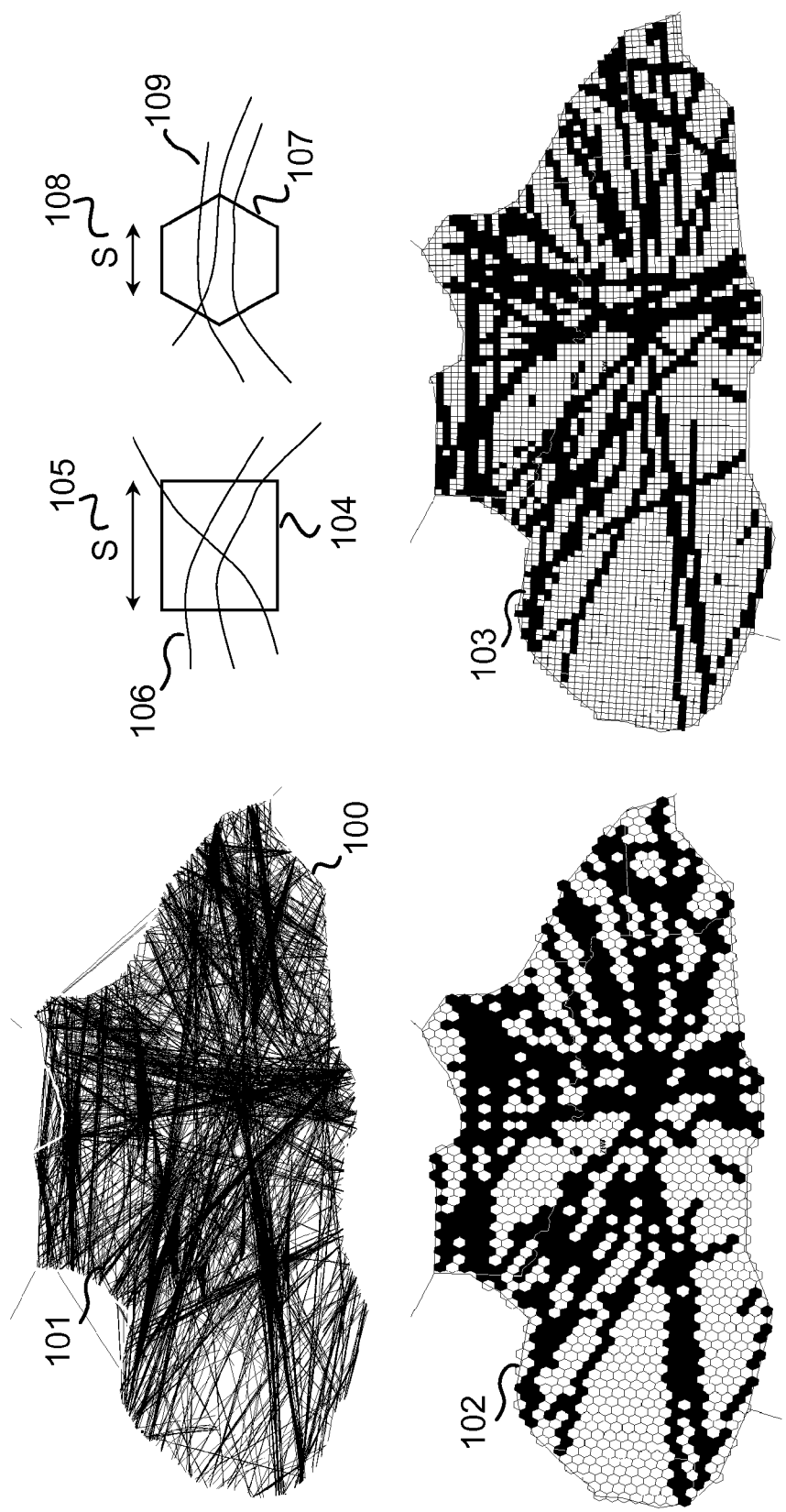
FIG. 2 presents an embodiment of the process of decomposing the region under study to rectangular or hexagonal cells, and computing density metrics for each cell using aircraft flying tracks.

Each cell may be considered a unit building block of airspace, and, using historical or forecasted traffic, airspace metrics are computed for each hex cell. For each cell, an ATC workload or traffic complexity measure is defined. This could be computed using radar hits (or position updates from a trajectory predictor), Dynamic Density or simulation models, such as Future Aviation Concept Evaluation Tool (FACET), Reorganized Mathematical ATC Simulator (RAMS), or Total Airport and Airspace Modeler (TAAM). FIG. 2 presents an example of decomposing a piece of airspace to cells and computing complexity metrics for each cell. As shown in this figure, the airspace under study could be identified by any hypothetical polygon or existing airspace boundary like any ARTCC (100) and its included flight trajectories (101). The airspace is then decomposed to rectangular or hexagonal cells (106 and 107) with a certain size (105 and 108) and traversing trajectories (106 and 109). For each cell, a complexity or workload measure is defined that can be computed using simulation models, Dynamic Density, or simply be the number of trajectories that cross each cell (aircraft count) during a certain time period. The highlighted cells can be color coded based on their relative workload, complexity, or aircraft count (102 and 103). Such color coding is called a complexity map.

Airspace complexity measure may not capture the directionality of traffic, and additional metrics may be needed for each cell that directly or indirectly measure the direction of predominant flows in each cell. These metrics enable the optimization process to minimize sector crossings, and to shape sector boundaries along major traffic flows. Two approaches may be used for defining traffic directionality metrics for each cell. These approaches are presented and described here.

Figure 3:
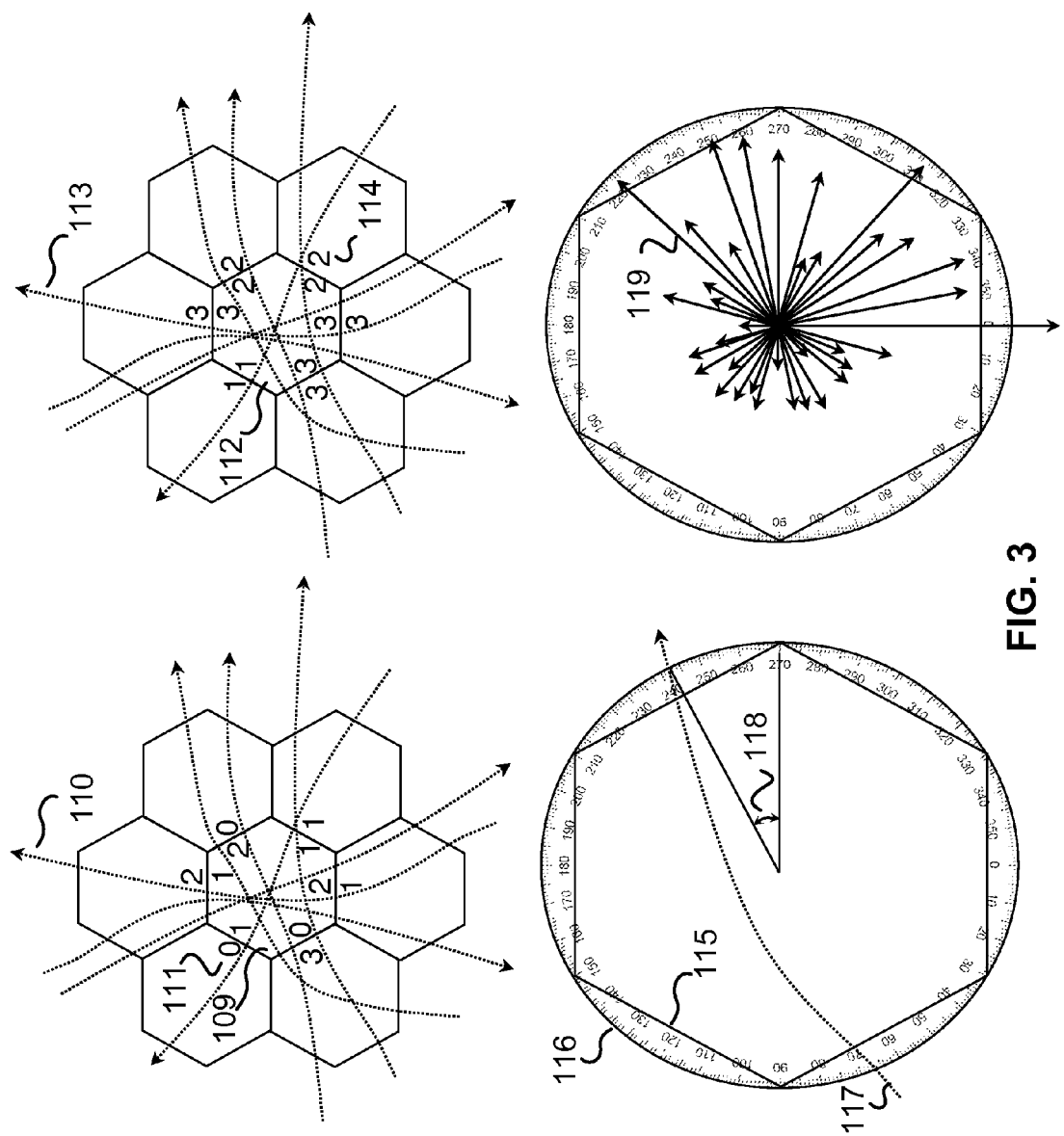
FIG. 3 illustrates the process of computing cell commonality metrics for pairs of adjacent cells using 1) number of aircraft transferred between adjacent cells and 2) traffic direction vectors.

The first process, as presented in FIG. 3, counts the number of aircraft (110) transferred from hex cell i (109) to its adjacent cells j. The process also computes a commonality metric (111) as $c_{i,j|j\ is\ adjacent\ to\ i}$=total number of aircraft transferred from cell i to its adjacent cell j during a given time interval. This transfer metric may be made symmetric by defining it as $c_{i,j|j\ is\ adjacent\ to\ i}$=total number of aircraft transferred from cell i to its adjacent cell j plus total number of aircraft transferred from cell j to its adjacent cell i. As shown in FIG. 3, for a cell i (112) and flight trajectories (113), the transfer metric (114) between i and its six adjacent cells j are symmetric: $c_{i,j}=c_{j,i}$. The commonality metric represents the cost of arc connecting two neighboring cells.

An alternative process to quantify the commonality between pairs of cells is to measure the degree of similarity for predominant traffic flow between them. Consider cell i with 6 neighboring cells j, j=1, ..., 6. Traffic in each of these 7 cells has a dominant direction. Now, a metric is needed that indicates among all 6 cells adjacent to cell i which one has the most similar traffic direction. FIG. 3 illustrates the process for determining which of the neighboring cells has the most traffic in the same direction as cell i. Each hex cell i (115) is first circumscribed with a circle (116) and subdivide the circle into arcs of m degrees each. So the circle will be divided into 360/m arcs. For each arc k, k=1, 2, ..., 360/m, we compute the number of flight trajectories ($n_k$) that cross the circle within arc k. For example in FIG. 3 aircraft trajectory (117) is crossing the circle by angle 243° (118). Then for each k=1, 2, ..., 360/m, a vector $\alpha_k^i$ is defined as having its tail at the center of cell i, with direction towards k's arc on the cirle, and magnitude $|\alpha_k^i|=n_k$. Finally, the commonality of cell i to its adjacent cell j is defined as:

$$c_{i,j} = \sum_{k=1}^{\frac{360}{m}} |\alpha_k^i| \cdot |\alpha_k^j|$$

Higher values of $c_{i,j}$ indicate greater commonality of traffic directions between cell i and its adjacent cell j.

Using the metrics for traffic load and complexity within each hex cell, and commonality metrics for pairs of adjacent cells, an optimization process is developed to cluster the cells into sectors in such a way as to: 1) minimize the variation of workload among sectors (workload/complexity balancing), 2) minimize the sector crossing events 3) minimize the number of required sectors to control a given traffic load and pattern, and 4) constrain the sector workload at any given time interval to be less than the workload or complexity that controllers are currently experiencing.

Figure 4:
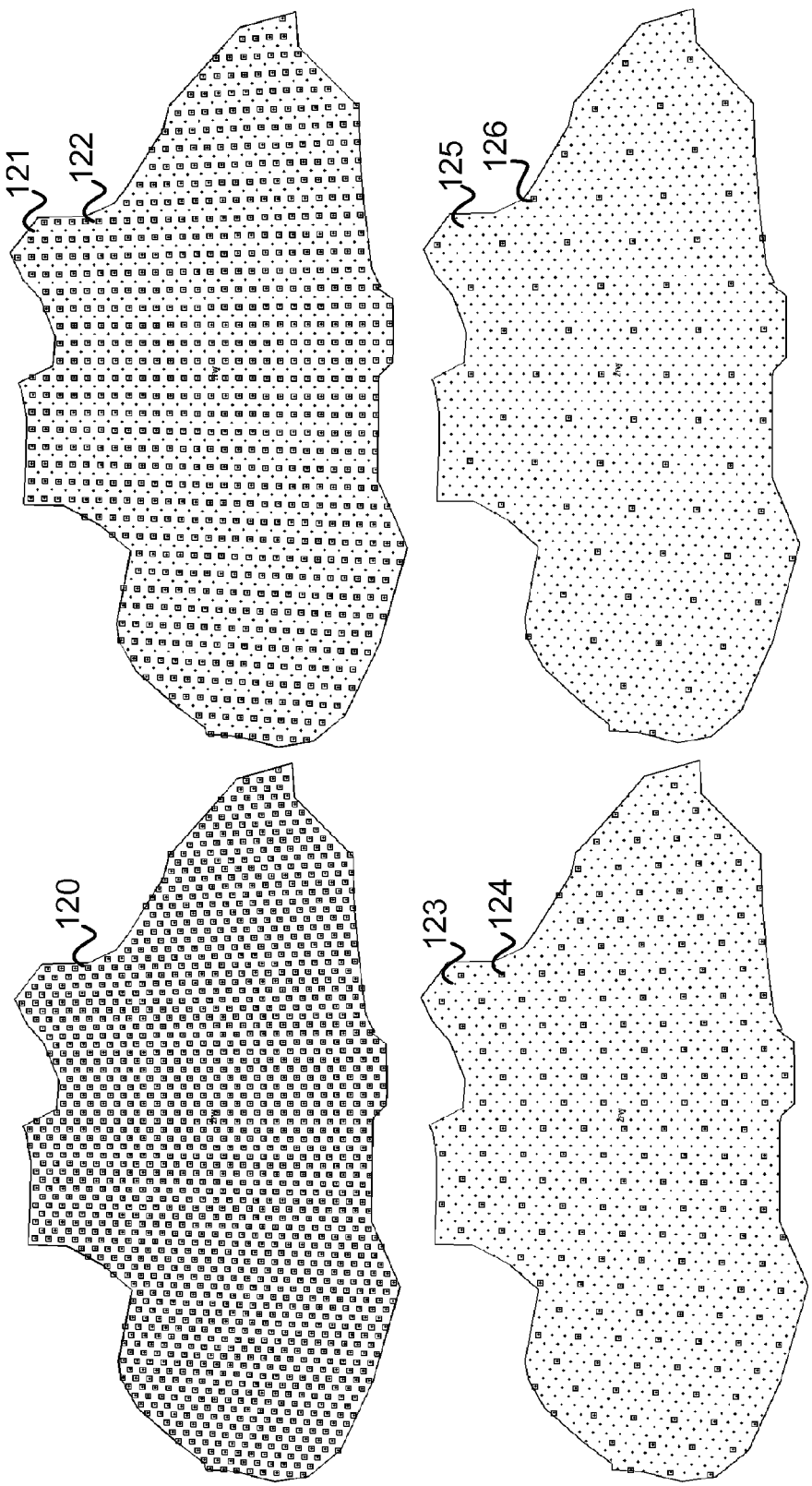
FIG. 4 illustrates examples of generating seeds in regular grids with different grid resolution.

The cells are clustered into sectors by bundling them around cells designated as seeds as presented in FIG. 4. Technically, every cell could be designated as a seed (120), but such an initialization may create unnecessary computational complexity without significant change in final result. Therefore, a subset of cells is selected and designated as seeds. There is no preference for which cells are selected as seeds. However, seeds should be spread widely enough to ensure proper clustering. Seeds are usually the points of a grid spaced evenly in the x and y directions. FIG. 4 shows centers of cells (121, 123, 125) and selected seeds on grids of decreasing resolution (122, 124, 126). Seeds can also be cells that represent a landmark, such as navigational fixes, airports, or facility locations, or any other fixed physical locations.

Figure 5:
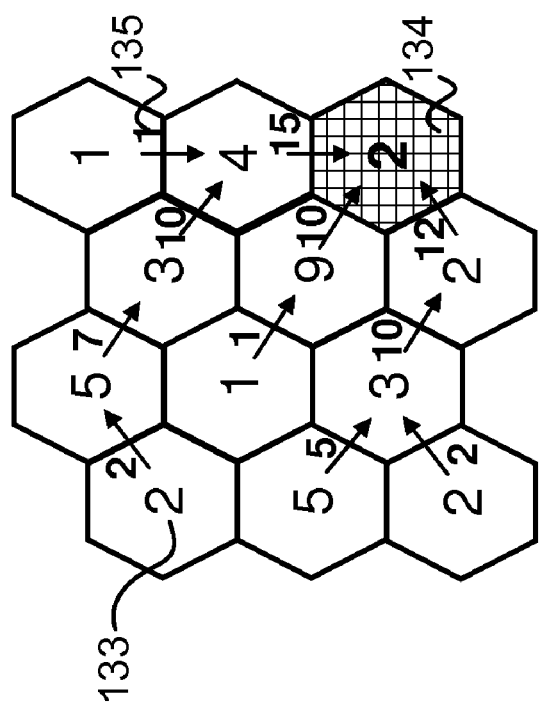
FIG. 5 illustrates the concept of creating a network by connecting centers of cells via arcs and designating some cells as seeds.
Figure 5:
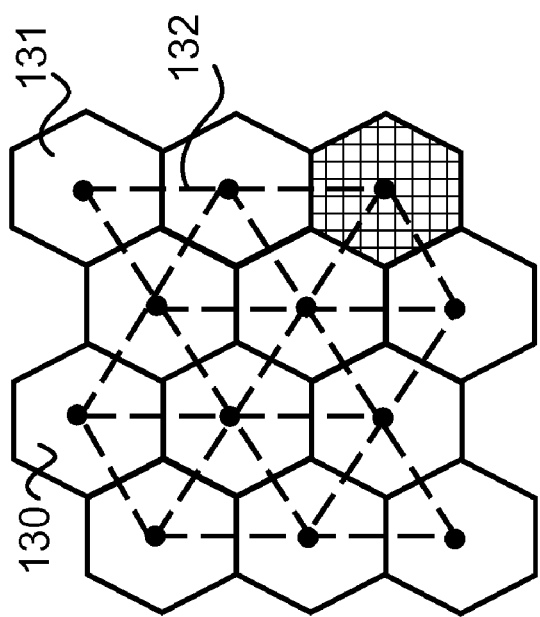

As presented in FIG. 5, a network is created in which cells are nodes (130 and 131), and arcs (132) connect adjacent nodes. Each node supplies commodity (133) that is the cell workload being transferred over the network. Each node is also a trans-shipment node. The seeds become sink nodes (134) that sink the commodity being supplied by supply nodes. Workload or complexity that is supplied by every node is transferred (135) via the network links all the way to the sink nodes.

Principles of network modeling are used as a means to cluster the cells into sectors according to multiple objectives and constraints. Due to the extraordinary requirements for sector optimization, there are many side constraints that need to be added to the network. Details of such network model are described in the following sections. The modeling techniques for clustering cells in two and three dimensions are described separately.

For the case of 2-D clustering, consider a piece of airspace decomposed to n cells in the same altitude range, and let i, j, and s define the cell and seed indexes:

i=1, 2, ..., n cell index j=1, 2, ..., n cell index s ⊂ {1, 2, ..., n} seed index Some cells are selected to be seeds, so the seed's index is a subset of all cell indices. The nomenclature below represents the network parameters:

open=number of sectors to be opened as defined by user $c_{i,j}$=commonality of cells i and j where i and j are adjacent $S_i$=amount of workload that each cell supplies $$\mu = \frac{\sum_i S_i}{\text{open}}$$

mean workload if workload is uniformly distributed

These known parameters are the number of desired sectors, calculated commonality of each cell to its adjacent cells, and the workload for each cell. The parameter μ is the mean workload for each sector, if workload is uniformly distributed among sectors.

The network decision variables are then defined as below:

$f_{i,j}$=flow of workload from cell i to cell j $y_s$=1 if seed s is opened as a sink, 0 otherwise $D_s$=demand at sink s $u_{i,j}$=0/1

Variables $f_{i,j}$ represent the flow of workload between pairs of adjacent cells, binary variables $y_s$ determine which seeds are to be used as sinks, and the demand at sink is denoted by $D_s$. The binary variables $u_{i,j}$ are alien variables that are required to enforce each demand cell to transfer demand via only one link to its adjacent node. The Mixed Integer Program (MIP), which operates over the network can then be written as follows:

$$\text{minimize} \sum_{i,j} \frac{f_{i,j}}{c_{i,j}} \quad (1)$$

subject to:

$$\sum_s y_s = \text{open} \quad (2)$$

$$\sum_{i | i \text{ is a To Node}} f_{i,j} - \sum_{j | j \text{ is a From Node}} f_{i,j} = S_i - D_{i | i \text{ is a sink node}} \quad (3)$$

$$D_s \geq L \times \mu \times y_s \quad L = (0.0, 1.0] \quad (4)$$

$$D_s \leq U \times \mu \times y_s \quad U = [1.0, 2.0) \quad (5)$$

$$\frac{f_{i,j}}{N} \leq u_{i,j} + y_{s=i} \quad (6)$$

$$\sum_j u_{i,j} = 1 \quad (7)$$

The objective function (1) is the sum of flows among all the cells divided by their corresponding commonality values. If $c_{i,j}=0$ for any arc, it is set to a small value ($\epsilon>0$) to avoid dividing by zero here. Minimizing the objective function results in transporting the network commodity via pairs of cells that have the highest commonality.

Constraint (2) specifies the desired number of sectors to be created. Constraint (3) are the flow conservation constraints specifying that for each node, inflows−outflows=supply−demand. Constraints (4) and (5) specify that total workload for each sector should be within lower and upper bounds (L and U) from the mean workload $\mu$. These bounds may be modified based on the desired workload variation among sectors. For example to constraint variation of workload among sectors to be ±5% we select L=0.95 and U=1.05. Constraints (6) and (7) together constraint supply values of each cell to be transferred outside the cell via only one arc. This is required to maintain unique assignment of cells to sectors.

Figure 6:
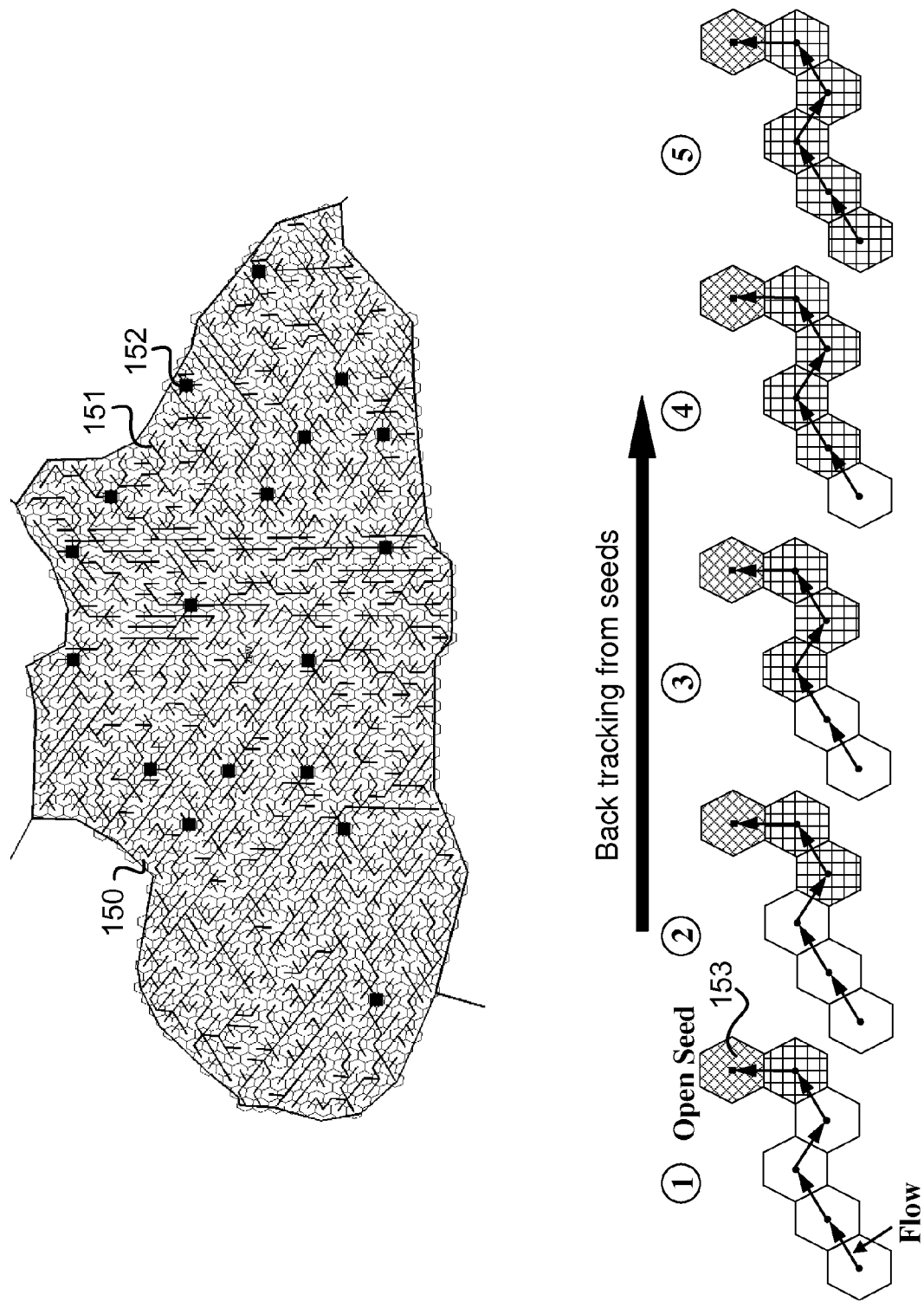
FIG. 6 depicts an example of a solved network with open seeds, links transporting commodity between adjacent cells all the way to open seeds, and the process of back tracking from each open seed to identify cells that are supplying a common seed.

After solving the model using MIP solvers (i.e. using CPLEX), all the cells that supply a common seed are assumed to belong to the same sector. FIG. 6 shows an example of the solved network. Black lines (151) that connect the cells (150) show that the workload is transferred via the corresponding link. The squares (152) indicate seeds that are selected to be sink nodes or they selected to be open. In general, network flow problems are more easily solved than integer programs. However, side constraints and auxiliary decision variables have been added, thereby increasing the complexity of the MIP. In spite of these changes, the total run time using a computer desktop server is in the range of few minutes for most of the problems.

Now all the cells that supply a common open seed are found. The solution file generated by CPLEX contains values for flow variables $f_{i,j}$ between pairs of adjacent cells which specify the assignment of cells to one of their neighboring cells. The solution file also includes binary variables $y_s$ which specify whether seed s is opened or not opened. From this information, the assignment of cells to sectors is inferred as illustrated in FIG. 6. Let the binary variable $x_{i,s}$ define the assignment of cell i to an open seed s. A post-processing module inspects an opened seed s (153) and its adjacent cells, and assigns $x_{i,s}=1$ if $f_{i,s}>0$. This logic can be formally expressed as: $(y_s=1 \wedge f_{i,s}>0) \Rightarrow (x_{i,s}=1)$. Then the process inspects cells adjacent to i and determines their assignment based on the logic: $(x_{i,s}=1 \wedge f_{j,i}>0) \Rightarrow (x_{j,s}=1)$. This backtracking continues until all the cells are assigned to seeds.

Figure 7:
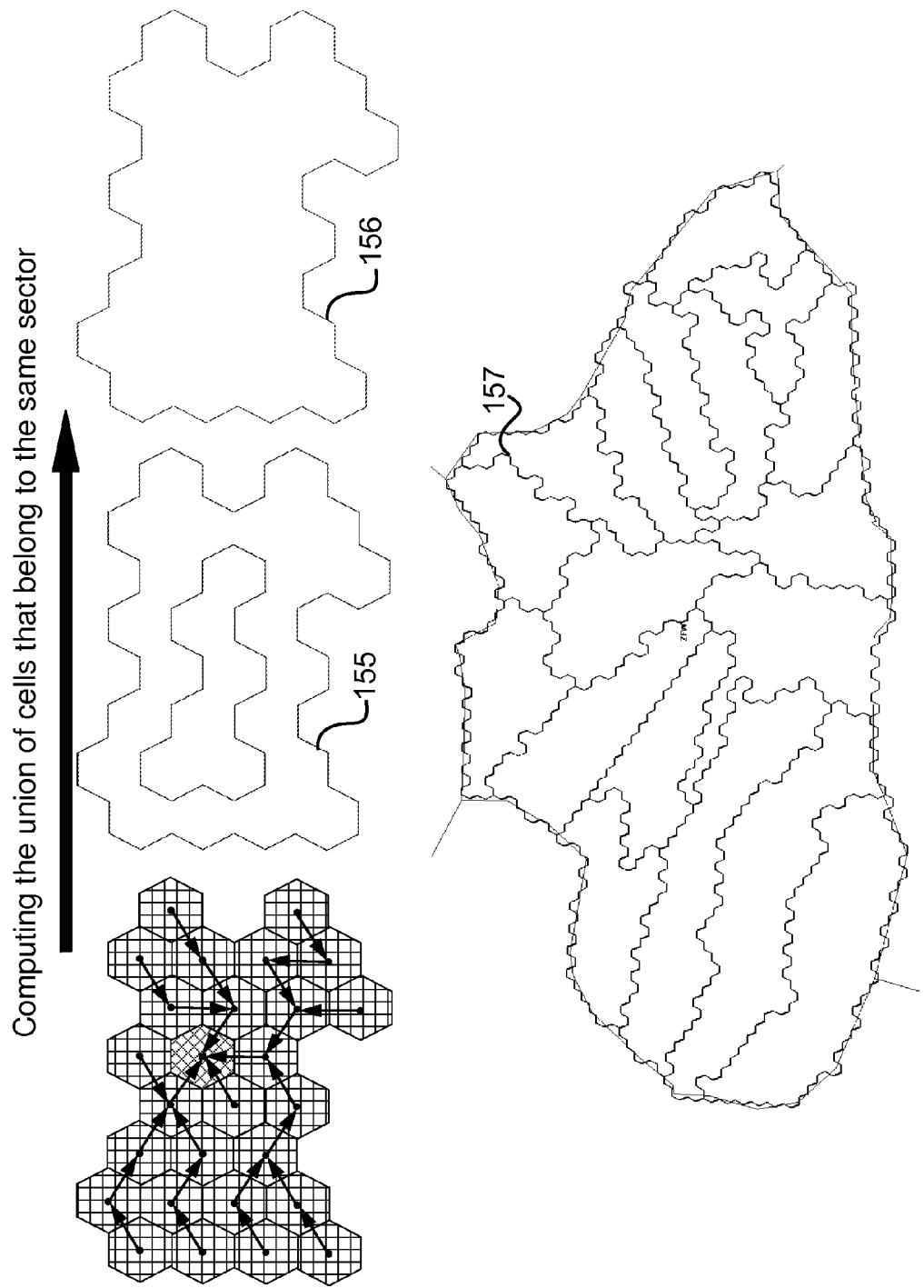
FIG. 7 illustrates the process of computing final sector boundaries from cell boundaries along with an example of computed sector boundaries.
Figure 8:
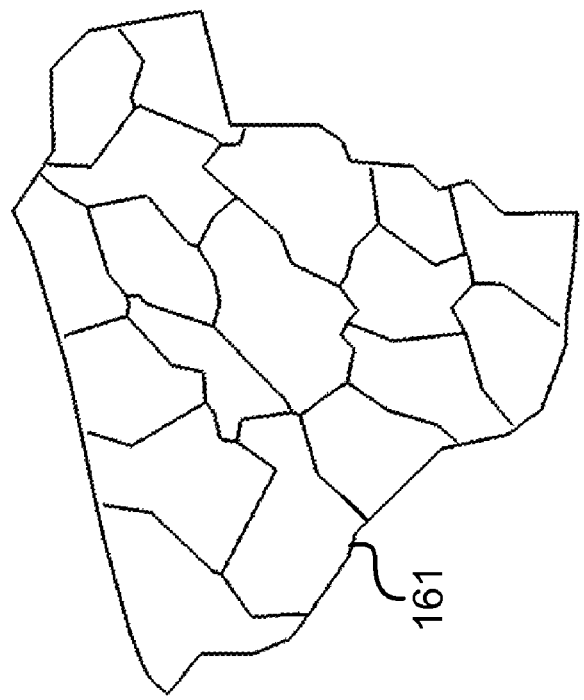
FIG. 8 presents an example of boundary smoothing.
Figure 8:
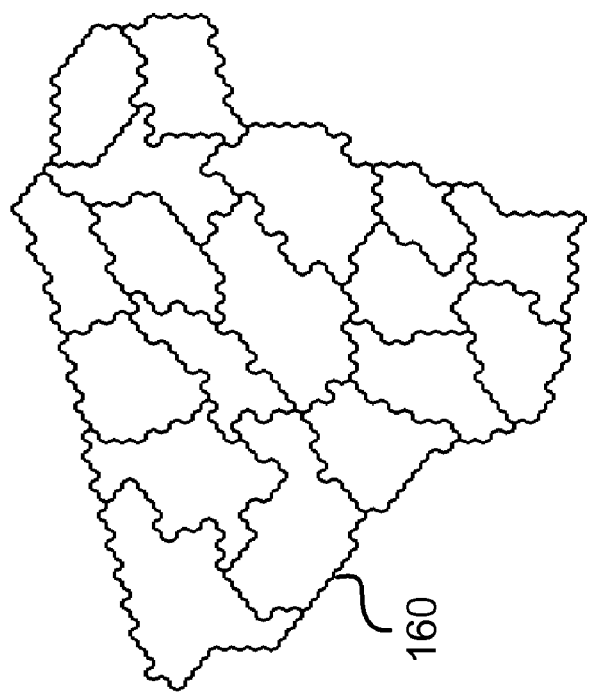

Another task is to compute the final sector boundaries. A sector is defined as the mathematical union of all the cells that are assigned to that sector. Forming a union of two polygons can be an expensive computational operation. FIG. 7 illustrates a more efficient, three-step technique: 1) determine the cells that are located on sector's boundary, 2) compute the union of only boundary cells (155), and 3) compute the smallest polygon that contains all vertices of the union of boundary cells (156). This final polygon constitutes the final sector boundaries (157).

Due to the inherent nature of cell-based sectorization, the produced sectors may have jagged boundaries. Jagged boundaries may be problematic because they could result in an aircraft exiting a sector and then re-entering the sector after a short period of time, thereby creating unnecessary workload for controllers. This jaggedness may be reduced by selecting smaller cells. However, to produce operationally suitable sectors, their boundaries may be smoothed. The simplest approach would be to reduce the number of vertices and edges without trying to preserve or enhance the objectives included in the MIP model. Different methods like Douglas-Peucker or Vertex Reduction methods can be used to smooth boundaries. FIG. 7 presents an example of smoothed boundaries. The initial solution (160) has jagged boundaries; after post-processing, the boundaries are much smoother (161).

One requirement for a good sectorization is to place the sector boundaries far from major flow intersections or critical points. An example process to include this requirement within the cell-based MIP sectorization is described.

Figure 9:
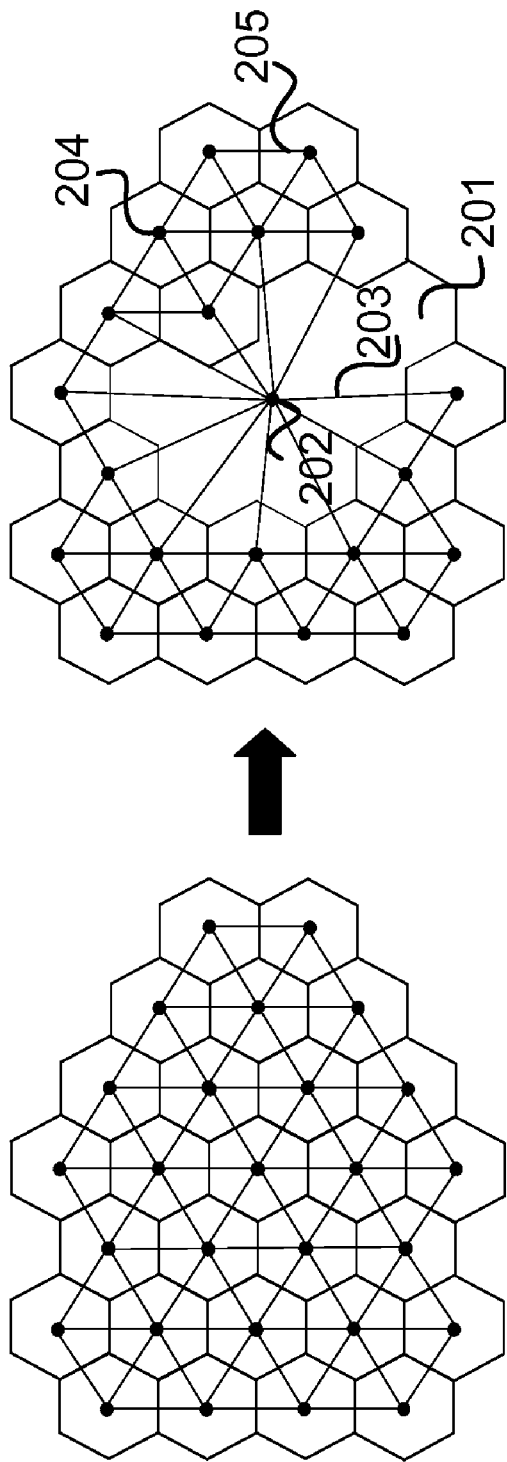
FIG. 9 illustrates grouping cells and updating network arcs after identifying cells around critical points.

In the MIP sectorization process, cells are clustered together to construct sectors. The clustering is performed using a network that connects adjacent cells, and the objective is to balance sector loading and minimize sector crossings for flights. To construct the MIP, network arcs are created between all the adjacent cells, and a cost is assign to each arc based on the commonality of adjacent sectors. The network model is built using only the arc definitions and their cost values; the cells need not be uniform in shape and size. Therefore, as presented in FIG. 9, some of the cells may be grouped into a larger cell (201) and generate a new network with updated arcs (203) and only one node for the grouped cells (202). The remaining nodes (204) within the network and their arcs (205) remain unchanged.

Figure 10:
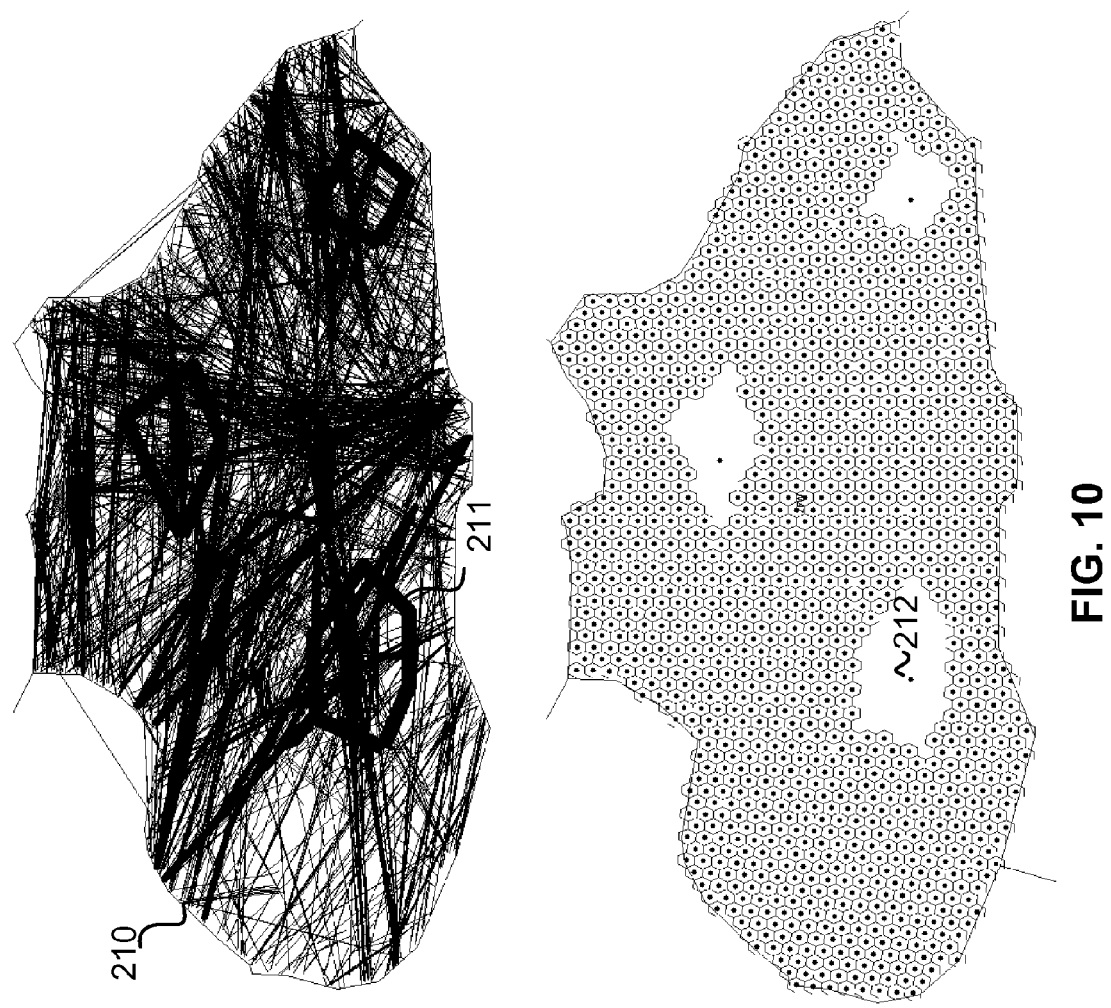
FIG. 10 illustrates an example of grouping cells around critical points and updating cell structure.
Figure 11:
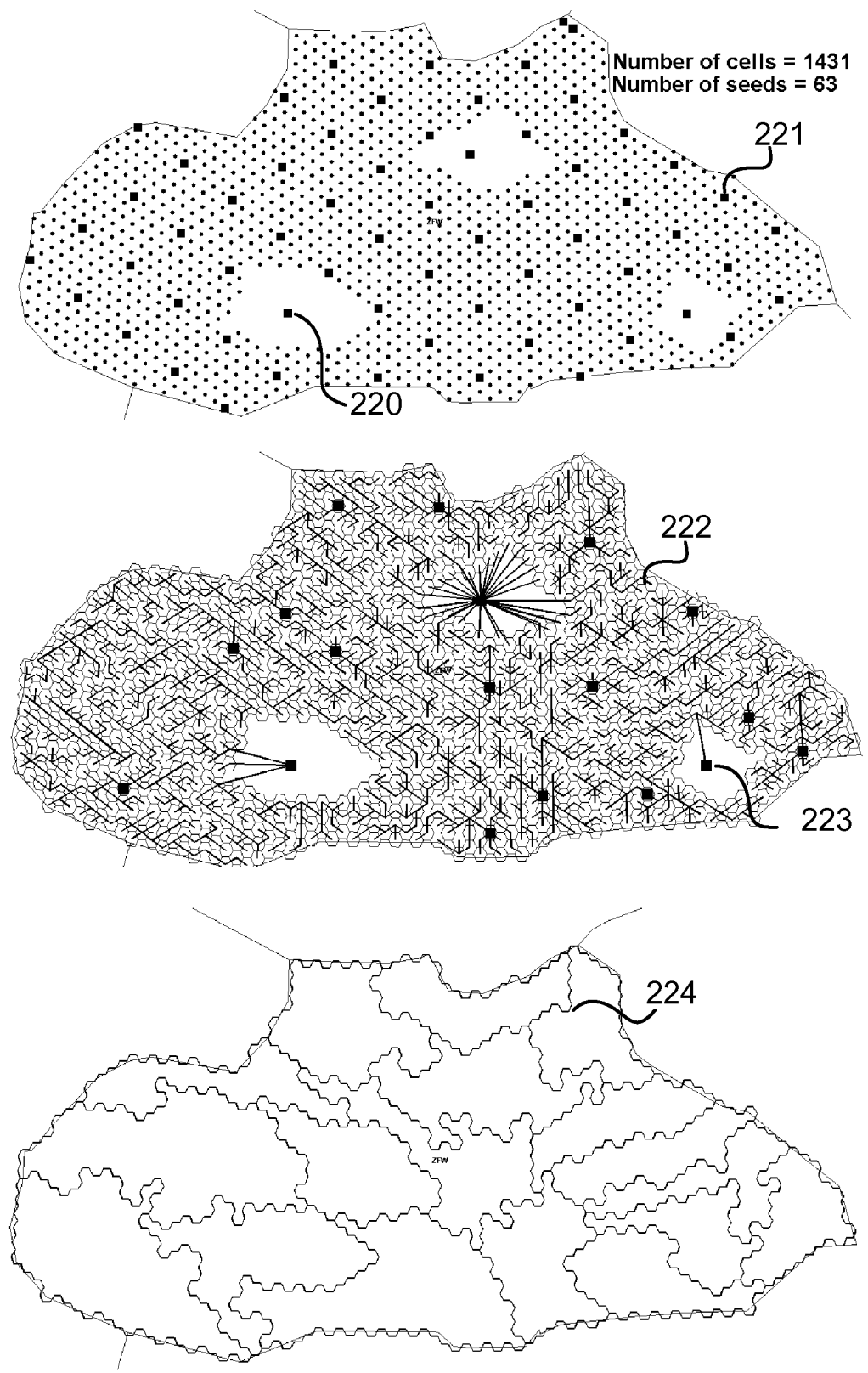
FIG. 11 presents examples of seed generation, a solved network, and sector boundaries after grouping cells around critical points.

This property allows us to group cells surrounding points that flights tracks intersect (critical points) into larger cells such that, after clustering, sector boundaries are located far from the track intersection points. As depicted in FIG. 10, given the flight trajectories (210), the airspace designer plots polygons (211) around critical points, and the cells within these polygons are grouped into one single cell (212). This results in an updated set of cells, bi-directional arcs, cell workload, and commonalities. As shown in FIG. 11, seeds are placed within the new grouped cells (220) in addition to seeds generated on a regular grid (221). This figure also presents the final network solution with open arcs (222) and open seeds (223). After producing the final sector boundaries (224), it is apparent that the boundaries are located far from the identified critical points.

Figure 12:
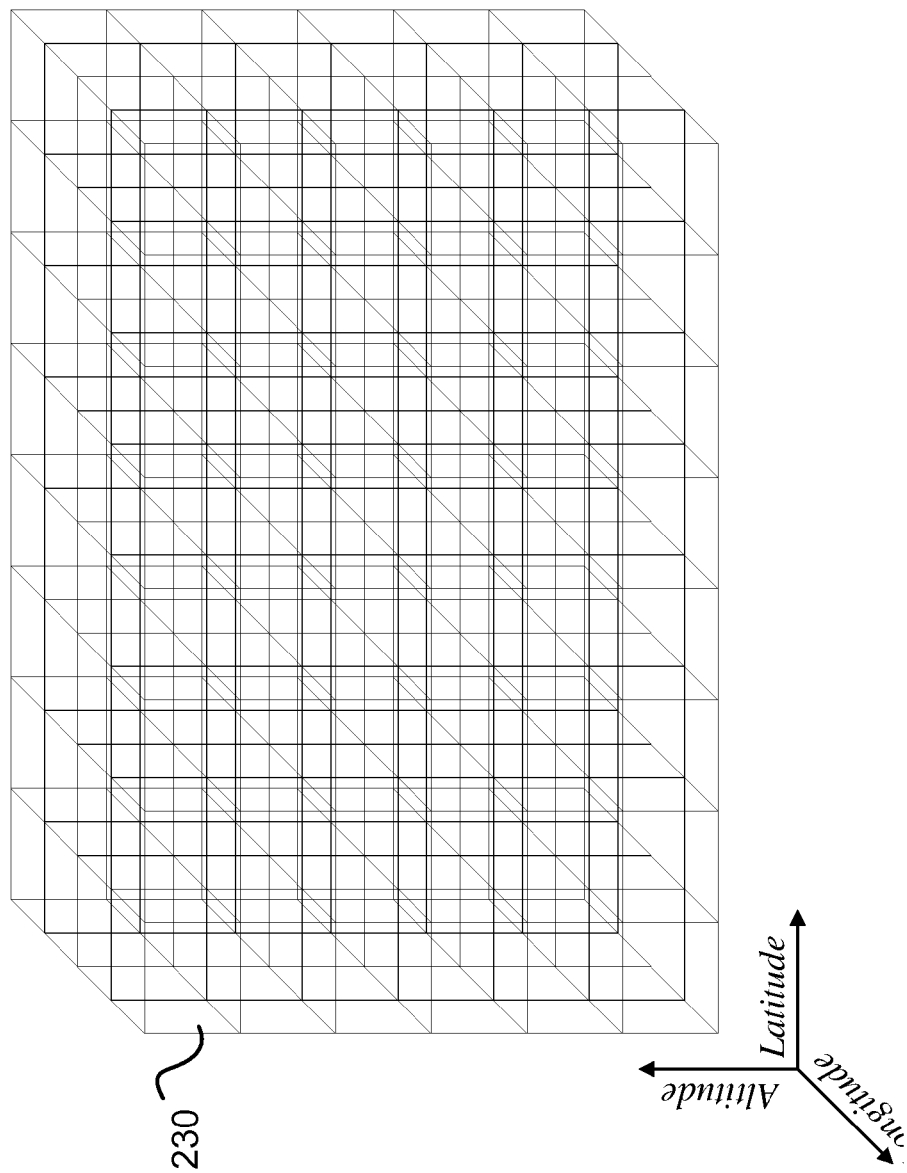
FIG. 12 illustrates the tiling of airspace with cubic cells for the 3-D clustering process.
Figure 13:
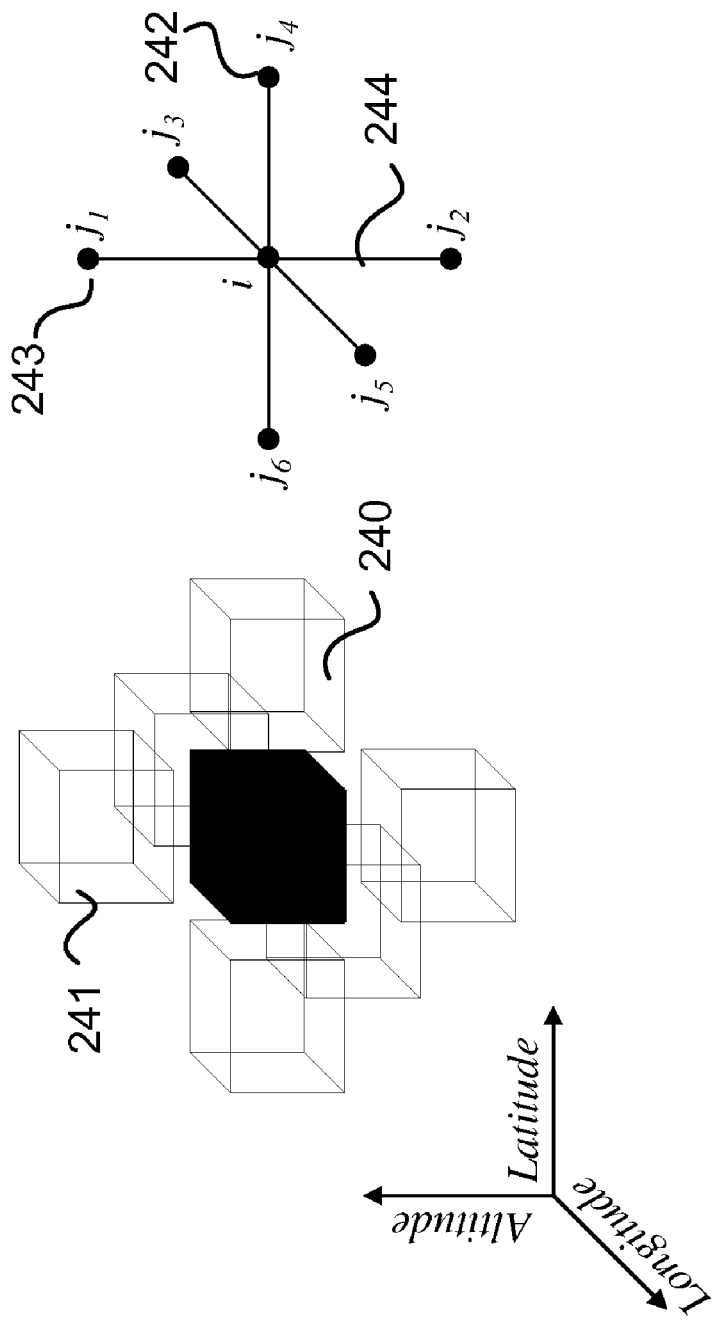
FIG. 13 illustrates the creation of a 3-D network by identifying a cell and its six adjacent cells.

In the 3-D approach, the airspace is tiled into altitude layers with equal height, and cells are right prisms with hexagonal or rectangular cross sections. For example, FIG. 12 illustrates a piece of airspace decomposed to rectangular cells (230). As shown in FIG. 13, in this orientation, cells have four neighbors in the horizontal plane (240) and two neighbors (241) in the layers above and below. Accordingly, a network with arcs (244) is built connecting cells to their four horizontal (242) and two vertical (243) cells. In each altitude layer, seeds are generated in a regular grid.

Figure 14:
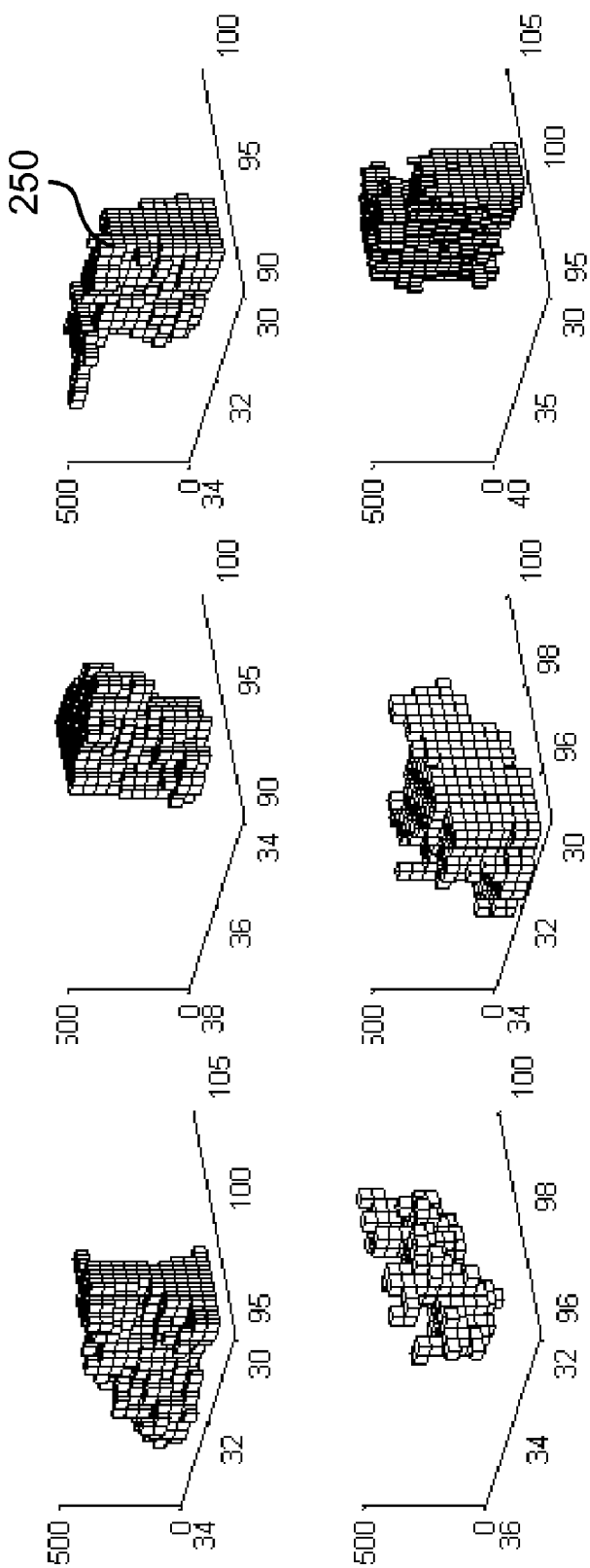
FIG. 14 illustrates irregular sectors output by the 3-D clustering of the mixed integer program without right prism constraints.

Using this network topology, the 3-D clustering problem is modeled. The MIP clusters the cells optimally using the same reasoning as in the 2-D problem. FIG. 14 is an example solution in which sectors are represented by clustered cells (250). This approach does not guarantee sectors with flat tops and bottoms as is required in today's airspace design. In fact, as seen in FIG. 14, the sector shapes can be quite irregular.

Figure 15:
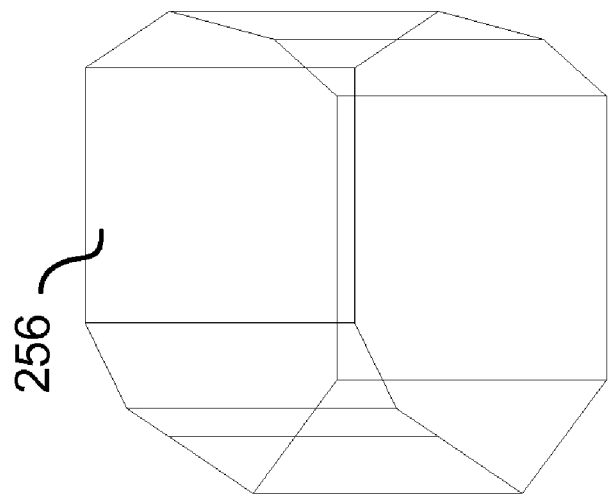
FIG. 15 presents an example of a general prism and an example of a right prism.
Figure 15:
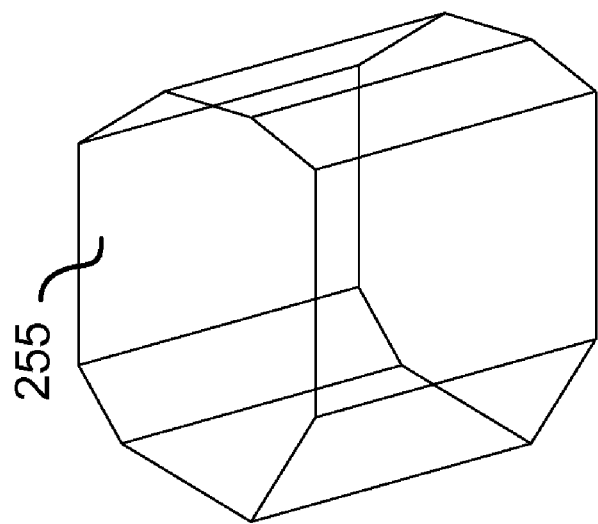

Air traffic controllers view sectors from a top-down perspective on their radar scopes, using a 2-D projection of the sector. This means that, for the foreseeable future, each sector may have the same cross section at every altitude layer. This ensures that a controller can visualize the third dimension (altitude) within his sector simply by knowing the upper and lower altitude of his sector. In geometrical terms, each sector should be a right prism. As shown in FIG. 15, a prism (255) is a 3-D polygon formed by parallel top and bottom made up of the same polygon, but shifted vertically in the third dimension (altitude, in this case). This means that each side is a parallelogram. A right prism (256) is a prism such that the sides meet the top and bottom at right angles. Therefore, each side is a rectangle. Right prisms are required for air traffic control, and this constraint is incorporated into the MIP.

Figure 16:
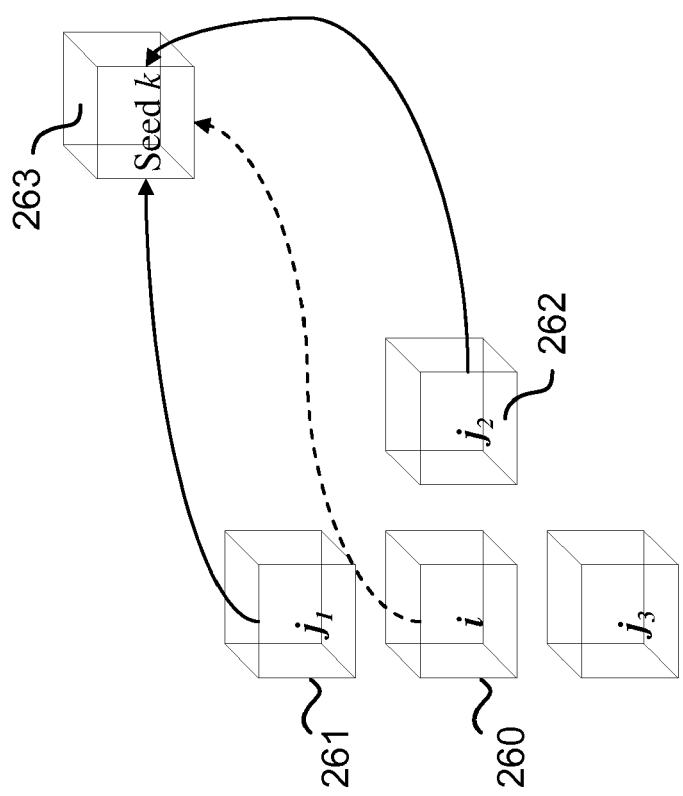
FIG. 16 illustrates the right-prism constraint for 3-D clustering. It states that if cells $j_1$ and $j_2$ are assigned to open seed k, then cell i may also be assigned to the same open seed.

As depicted in FIG. 16, one way to enforce the right prism constraint is to assign cell i (260) to seed k (263) if one of its horizontal neighbors (262) together with one of its vertical neighbors (261) are assigned to sector k. FIG. 16 demonstrates this logic. If cells $j_1$ and $j_2$ are assigned to sector k, then cell i also needs to be assigned to the same sector k. Similarly, if cells $j_2$ and $j_3$ are assigned to sector k, cell i is also required to be assigned to the same sector. A constraint is created for each cell and one of its horizontal and one of its vertical neighbors. For each non-boundary cell, there are eight such three-cell configurations: one for each of the four horizontal neighbors and the upper neighbor, and one for each of the four horizontal neighbors and the lower neighbor. In order to express such constraints mathematically, a set of binary assignment variables is defined for every cell.

Assume that K is the set of seeds. Then for every cell i, the following $|K|$ binary variables are declared: $\{x_i^1, x_i^2, \ldots, x_i^{|K|}\}$, where $x_i^k=1$ if cell i is assigned to sector k and $x_i^k=0$ otherwise. The following expression states the right prism constraint described above for cell i and two of its neighbors $j_1$ and $j_2$ illustrated in FIG. 16:

$$x_{j_1}^k + x_{j_2}^k \leq x_i^k + 1, \forall k=1,2,\ldots,|K|$$

This yields eight right prism constraints (non-boundary cells may have fewer):

$$x_{j_1}^k + x_{j_2}^k \leq x_i^k + 1, \forall k=1,2,\ldots,|K|; \text{ for 3-cell}(i,j_1,j_2) \quad (i)$$

$$x_{j_2}^k + x_{j_3}^k \leq x_i^k + 1, \forall k=1,2,\ldots,|K|; \text{ for 3-cell}(i,j_2,j_3) \quad (ii)$$

$$x_{j_3}^k + x_{j_4}^k \leq x_i^k + 1, \forall k=1,2,\ldots,|K|; \text{ for 3-cell}(i,j_3,j_4) \quad (iii)$$

$$x_{j_1}^k + x_{j_4}^k \leq x_i^k + 1, \forall k=1,2,\ldots,|K|; \text{ for 3-cell}(i,j_1,j_4) \quad (iv)$$

$$x_{j_1}^k + x_{j_5}^k \leq x_i^k + 1, \forall k=1,2,\ldots,|K|; \text{ for 3-cell}(i,j_1,j_5) \quad (v)$$

$$x_{j_5}^k + x_{j_3}^k \leq x_i^k + 1, \forall k=1,2,\ldots,|K|; \text{ for 3-cell}(i,j_5,j_3) \quad (vi)$$

$$x_{j_3}^k + x_{j_6}^k \leq x_i^k + 1, \forall k=1,2,\ldots,|K|; \text{ for 3-cell}(i,j_3,j_6) \quad (vii)$$

$$x_{j_6}^k + x_{j_1}^k \leq x_i^k + 1, \forall k=1,2,\ldots,|K|; \text{ for 3-cell}(i,j_6,j_1) \quad (viii)$$

A MIP is defined to perform the 3-D clustering with right-prism sectors. This differs from the MIP already defined for the 2-D problem in two respects. First, the right-prism constraints have been added. Second, the formulation is updated to be a multi-commodity flow problem. The problem is still modeled as a network in which centers of the cells are nodes of the network and each cell is connected to at most six adjacent cells, as shown in FIG. 13. Now, we explicitly state the assignment of each cell to a unique seed. This is done by introducing assignment variables. Note that in the original 2-D version of the MIP, explicit assignment of cells to seeds is avoided, as the introduction of more integer variables generally increases the time required to solve the problem.

Every seed in the network has a demand for a unique commodity that corresponds only to that seed, and every cell in the network can supply all commodities, which in turn means that each cell can be potentially assigned to any sector. However, for a solution to be feasible, each cell needs to supply only one commodity (therefore each cell is assigned to exactly one sector). Each cell can supply flow to any of its neighbors via links that connect centers of neighboring cells.

G=(N,A) is the underlying network, where N is the set of nodes (cells) and A is the set of directed arcs connecting the cells. Each node can send and receive flow from its adjacent cell via a pair of directed arcs.

The parameters of the model are the same as the 2-D case, and the decision variables are as follows:

$f_{i,j}^k$=flow of commodity k (workload) exiting node i and entering node j $x_i^k$=binary variable: assumes value 1 if cell i is assigned to seed k, 0 otherwise $D_s$=demand at sink (seed) s $y_s$=binary variable: 1 if seed s is chosen as a sink, 0 otherwise MIP representation of the model is as follows:

$$\text{Min. } z = \sum_{(i,j) \in A} \sum_k \frac{1}{c_{ij}} f_{ij}^k \quad (8)$$

Subject to:

$$\sum_{s=1}^{K} y_s = \text{open}, \quad (9)$$

$$\begin{cases} \sum_{j:(i,j) \in A} f_{ij}^k - \sum_{j:(j,i) \in A} f_{ji}^k = x_i^k S_i, & \forall i \notin K; \forall k; (i,j) \in A \\ \sum_{j:(i,j) \in A} f_{ij}^k - \sum_{j:(j,i) \in A} f_{ji}^k = x_i^k S_i - D_i, & \forall i \in K; \forall k; (i,j) \in A \end{cases} \quad (10)$$

$$D_s \geq L\mu y_s, \quad L = (0.0, 1.0] \quad (11)$$

$$D_s \leq U\mu y_s, \quad U = [1.0, 2.0) \quad (12)$$

$$x_j^k + x_l^k \leq x_i^k + 1, \quad \forall i, k; \quad j : i\text{'s horizontal neighbor,} \quad (13)$$
$$l : i\text{'s vertical neigbor for all 3-cell}$$
$$\text{configurations of cell } i \text{ and its neighbors}$$

$$\sum_k x_i^k = 1, \quad \forall i \quad (14)$$

$$f_{ij}^k \leq M x_i^k, \quad \forall i, k; \quad (i,j) \in A, \quad M \text{ is a sufficiently large integer} \quad (15)$$

$$x_k^k = y_k, \quad \forall k \in K \quad (16)$$

$$f_{ij}^k \geq 0 \; \forall i, k; \quad y_s \in \{0,1\}, \quad \forall s \in K; \quad x_i^k \in \{0,1\}, \quad \forall i \in N, \; s \in K \quad (17)$$

As in the 2-D clustering model, minimizing the objective function (8) results in transporting the network commodity via pairs of cells that have the highest commonality. Constraint (9) forces the number of open seeds (sectors) to be a fixed number. Constraints (10) represent the flow conservation constraints for each cell i and commodity k. If cell i is assigned to sector k ($x_i^k=1$), then the constraint states that for cell i, inflow equals outflow plus workload supplied by cell i, and $f_{ij}^l=0$, $x_i^l=0$ where l≠k. Note that if cell i is a seed, then inflow minus outflow equals supply minus demand.

Constraints (11) and (12) force the total workload for each sector to be within lower and upper bounds L and U from the mean workload μ. These bounds can be modified based on the desired workload variation among sectors. A value of ±5% is often used, hence L=0.95 and U=1.05.

Constraints (13) are the right prism constraints. As previously explained, they need to be declared for each cell i∈N, for 3-cell configuration of i, and for each commodity. These constraints ensure that if one horizontal and one vertical neighbor of i are assigned to sector k, then i is also assigned to the same sector.

Constraints (14) ensure that each cell is assigned to only one sector. Constraints (15) guarantee that if any amount of commodity k flows from i to any of its neighbors j ($f_{ij}^k>0$), then i is assigned to sector k; similarly, if cell i is not assigned to sector k ($x_i^k=1$), then $f_{ij}^k=0$. M is a fixed integer chosen to be larger than any possible flow value, so that the constraint is enforced. For example M=Uμ+1.

Constraints (16) ensure that if seed k is open and is the sink node for sector k, then it is assigned to itself and not to any other sector. Constraints (17) state the variables of the model.

In presented 3-D model, unlike in the 2-D model, the restriction that every cell can only supply its workload through a unique link has been removed, and each cell potentially can utilize all of its outgoing arcs to supply the flow. The unique assignment of cell to sectors is enforced by constraints (14). Alternatively, we could remove constraints (14) and instead restrict cells to have outflow to only one of their adjacent cells:

$$\frac{f_{i,j}^k}{N} \le u_{i,j} + y_{s=i} \quad \forall \, i, k; \quad (i, j) \in A, \tag{18}$$

N is a sufficiently large integer, $$\sum_j u_{i,j} = 1, \tag{19}$$

$(i, j) \in A$

Now, the original 2D model is considered to define additional shape constraints. The cost function of the MIP model encourages sectors to align with the dominant flow, while the constraints ensure that workload is balanced across all the sectors. This model may produce highly concave sectors that may not be operationally desirable, even though they minimize sector crossings. To encourage the model to avoid such highly concave sectors, shape constraints are included as defined in this section.

The degree of a polygon's convexity can be measured by the ratio of the polygon's perimeter to its area:

$$R = \frac{\text{perimeter}}{\text{area}}.$$

Figure 17:
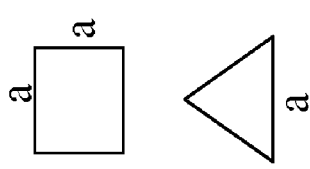
FIG. 17 presents the perimeter-to-area ration (R) for triangle, rectangle, and circle.

Examples of computing this ratio for a circle, rectangle, and triangle appear in FIG. 17. As depicted in FIG. 17, R is inversely related to the polygon's area: larger polygons of the same class have smaller R values. For example, as a circle's radius r increases, its area ($\pi r^2$) increases faster than its perimeter ($2\pi r$), thereby decreasing its R value exponentially. This is because R is not a non-dimensional value. The ratio R can also be expressed using grid cells within a polygon. We overlay a cell grid over any given sector, and use the number of boundary cells and total cells inside each sector to define the ratio R as $$R = \frac{\text{number of boundary cells}}{\text{total number of cells within a polygon}}.$$

Figure 18:
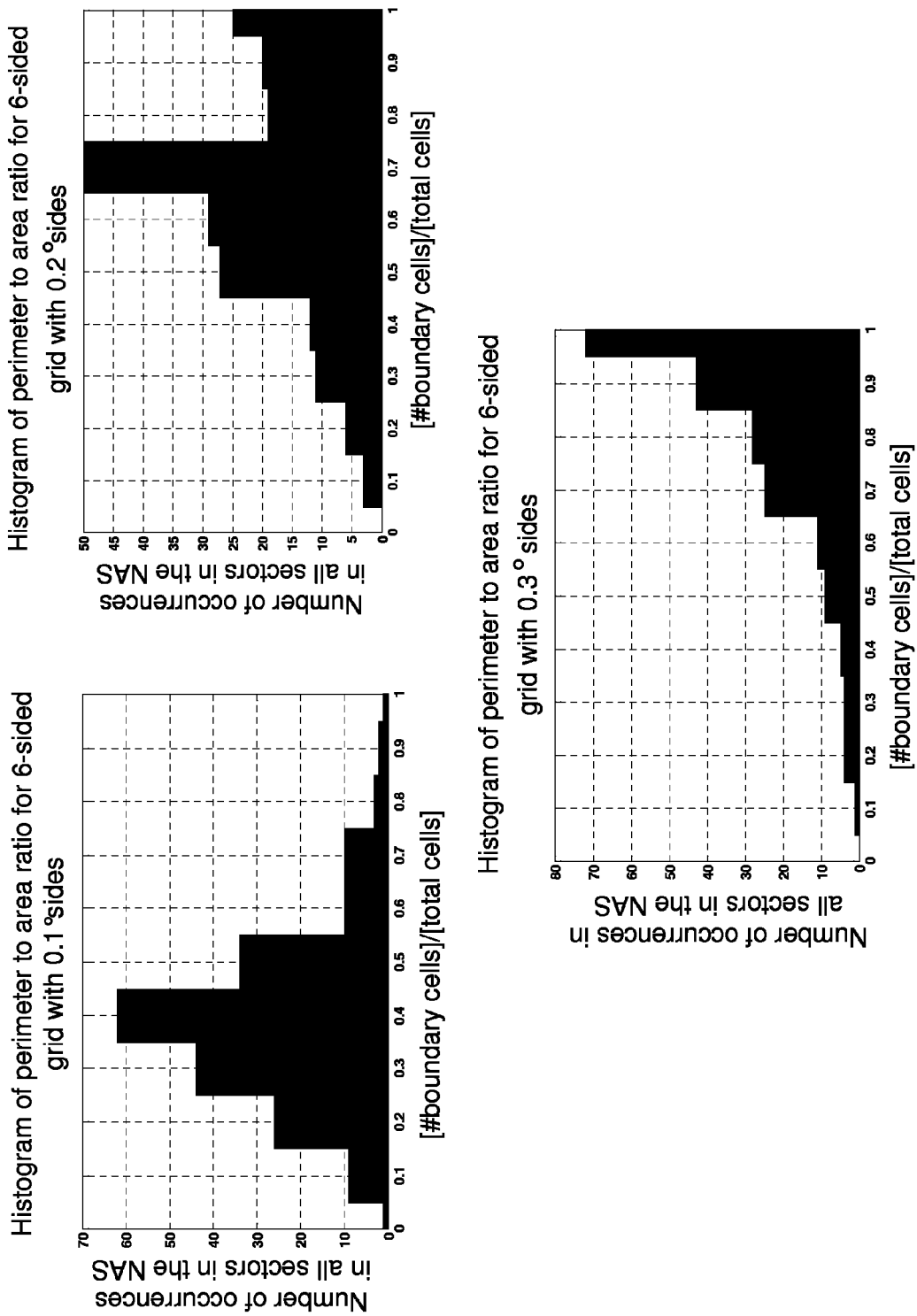
FIG. 18 depicts histograms of perimeter-to-area ratios for the sectors in the NAS for different hexagonal grid cell sizes (0.1° to 0.3°).
Figure 19:
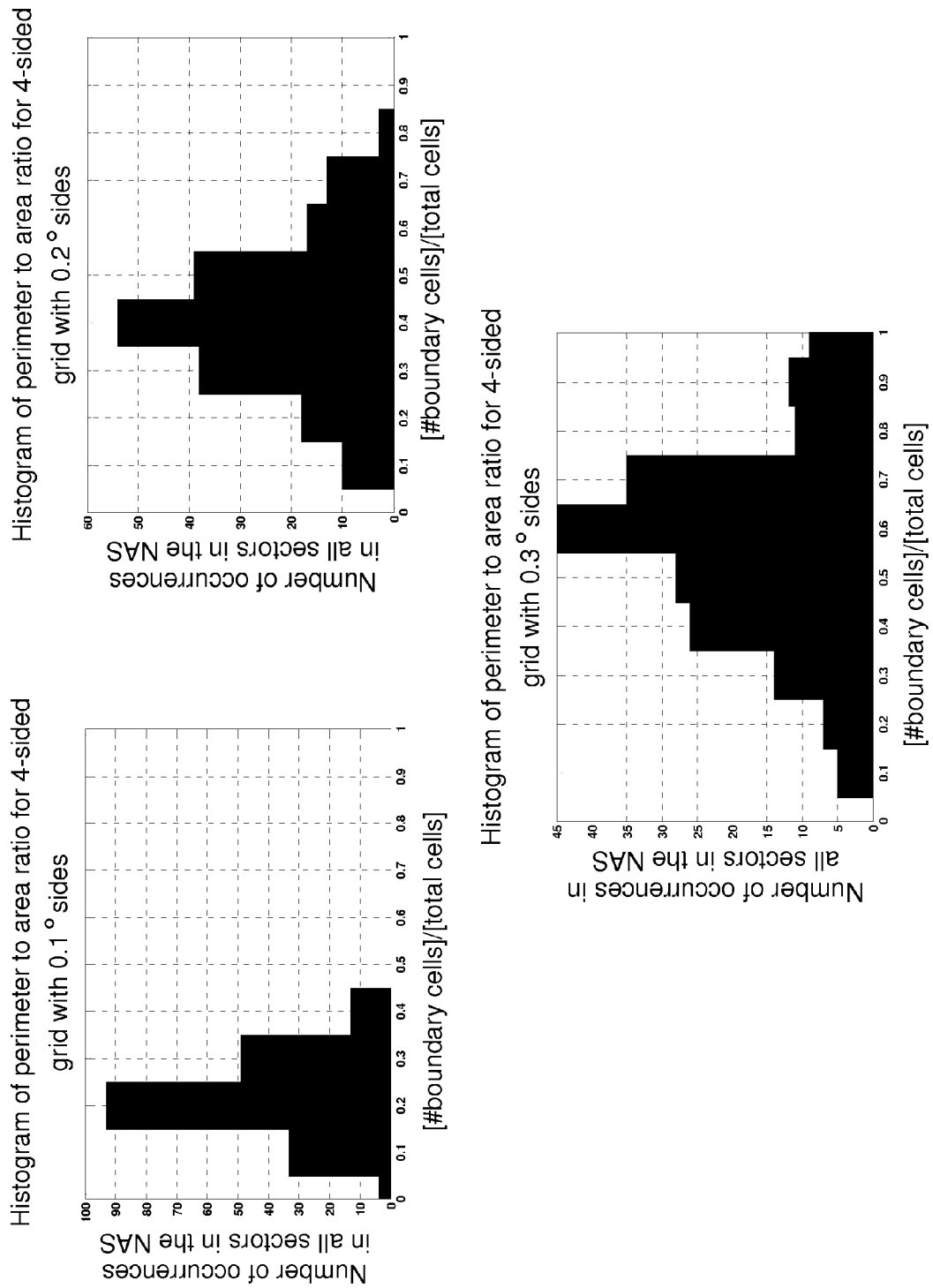
FIG. 19 depicts histograms of perimeter-to-area ratios for different rectangular grid cell sizes (0.1° to 0.3°).

Now we attempt to introduce new constraints within the 2-D model to limit the ratio R for each sector. We first analyze the R value for existing sectors to identify a reasonable range for R. Using the latitude and longitude of the vertices of the low, high, and super-high airspace sectors, R is computed for each sector based on a division of the different altitude sectors into hexagonal or rectangular cells of various sizes. Histograms showing different bins of the ratio R for all super-high sectors in the NAS divided into a hexagonal grid are shown in FIG. 18. These figures show how R varies for current airspace sectors as the grid cell size increases from 0.1° in the top left figure to 0.3° in the bottom figure. Histograms showing R for all super-high sectors for rectangular grid cells are shown in FIG. 19.

Figure 20:
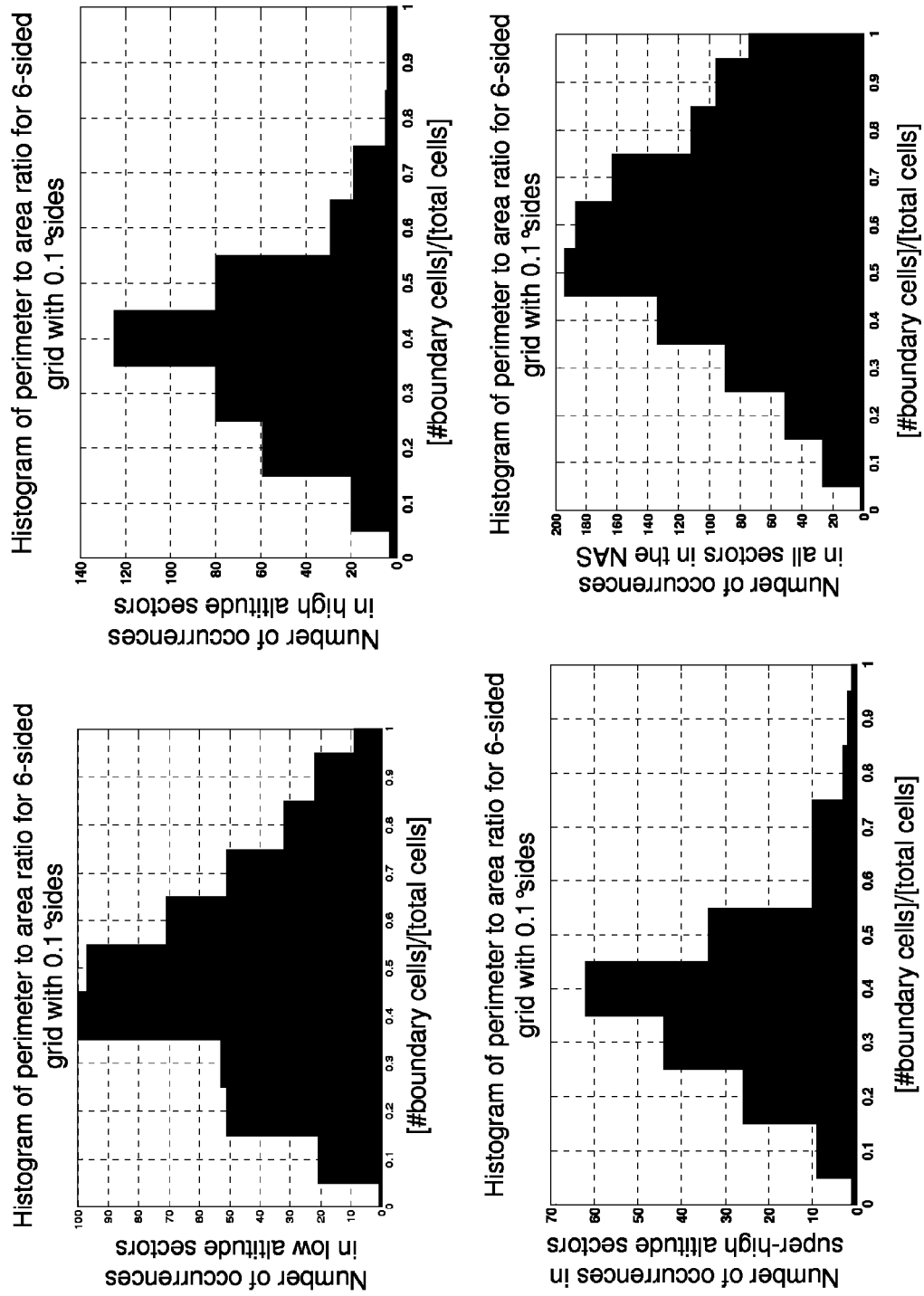
FIG. 20 depicts histograms of perimeter-to-area ratios for low-, high-, super-high, and all NAS sectors.

In addition, to demonstrate how R varies across all sectors independent of altitude, FIG. 20 bins the values of R into low, high, super-high, and all sectors combined for a hexagonal grid of side length 0.1°.

Figure 21:
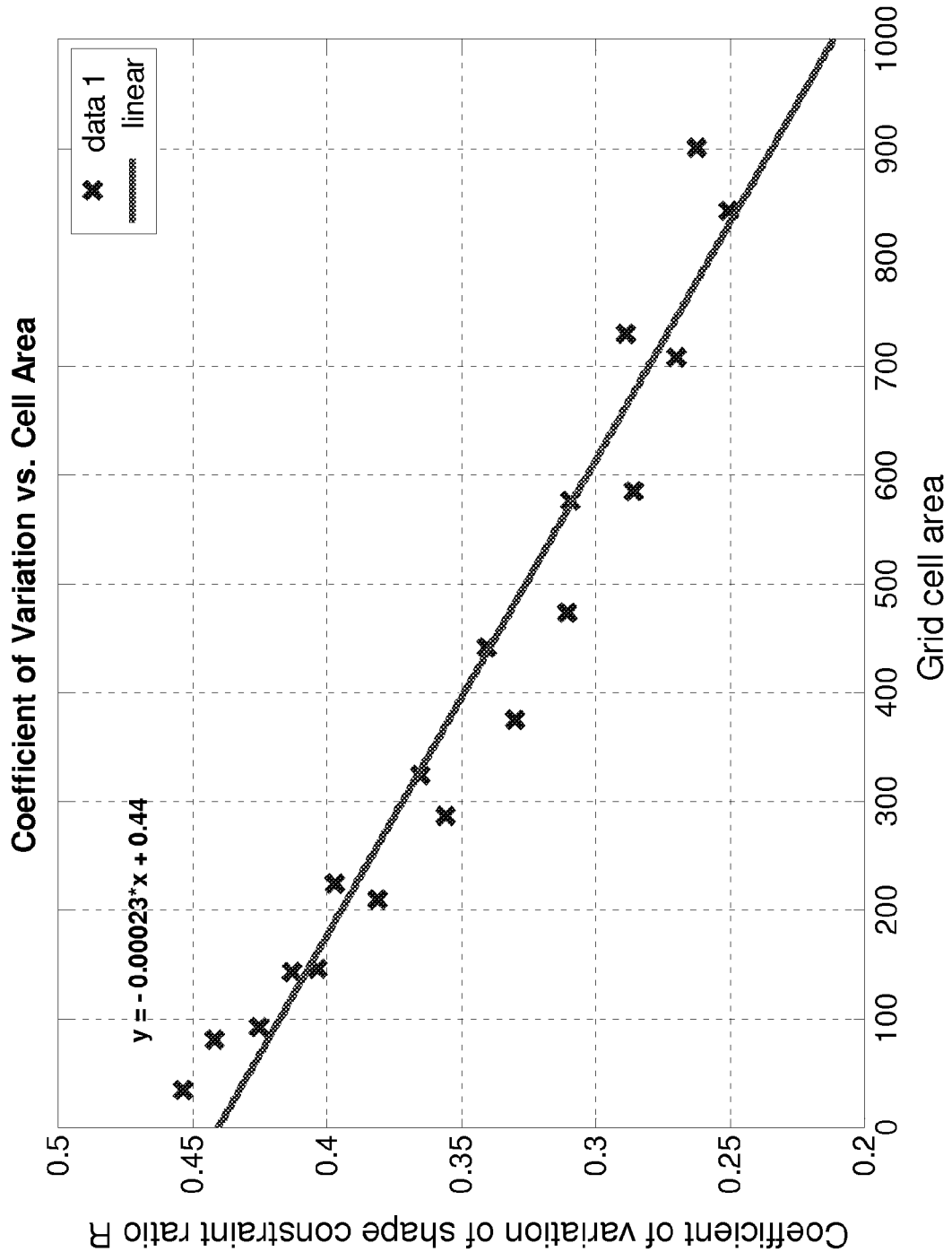
FIG. 21 presents the relationship of coefficient of variation of shape constraint ratio R versus grid cell area.

Based on these figures, it appears that as the area of the individual sector grid pieces increased, the average value of R also increased. In order to verify this trend, the coefficient of variation $$C_v = \frac{\sigma}{\mu}$$

may be plotted for both hexagonal and rectilinear grid shapes, giving the results presented in FIG. 21. In that figure, σ is the standard deviation for the given grid cell shape and size, and μ is the mean. FIG. 21 demonstrates that there is a clear correlation between grid cell area and the mean of R for different grid shapes. The coefficient of variation was used to perform this comparison in order to normalize the differences in the spread of the data.

Figure 22:
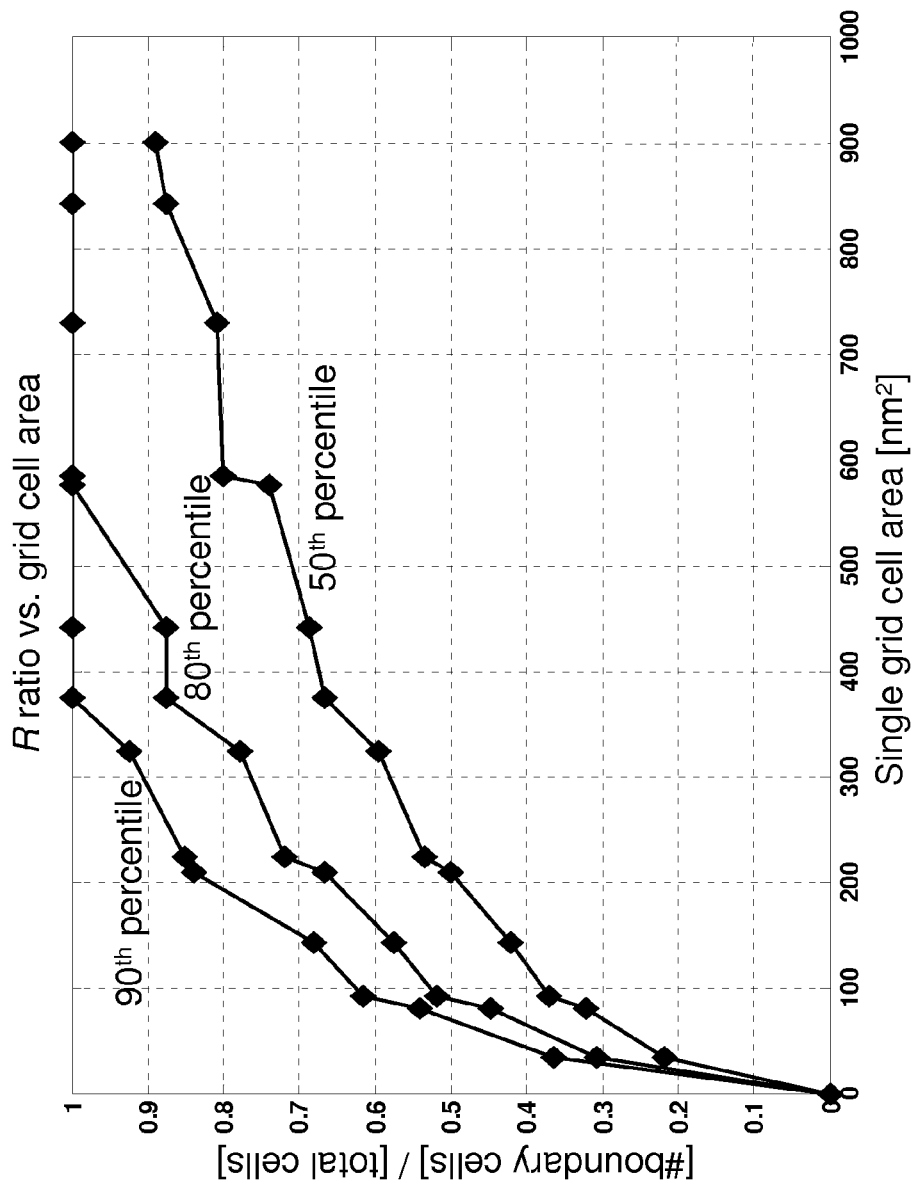
FIG. 22 depicts the shape constraint ratio R for varying grid cell areas.

After observing a definite relationship between grid cell area and R, lookup tables may be constructed that allow the optimization program to choose the limits on R so that concave sectors can be avoided. Since the user enters the size of the grid constructing cell, the R value corresponding to historical data trends can be chosen along with a desired percentile. FIG. 22 presents the trends for R values plotted against the grid cell area for the 50th, 80th, and 90th percentiles of historical data. These lines indicate that at a given point on the line, n percent of all of the sectors have an R value at or below this value.

Sample lookup tables are presented in FIG. 23. For varying grid cell shapes and sizes, the relevant R ratio can be found in the right hand side columns.

Figure 24:
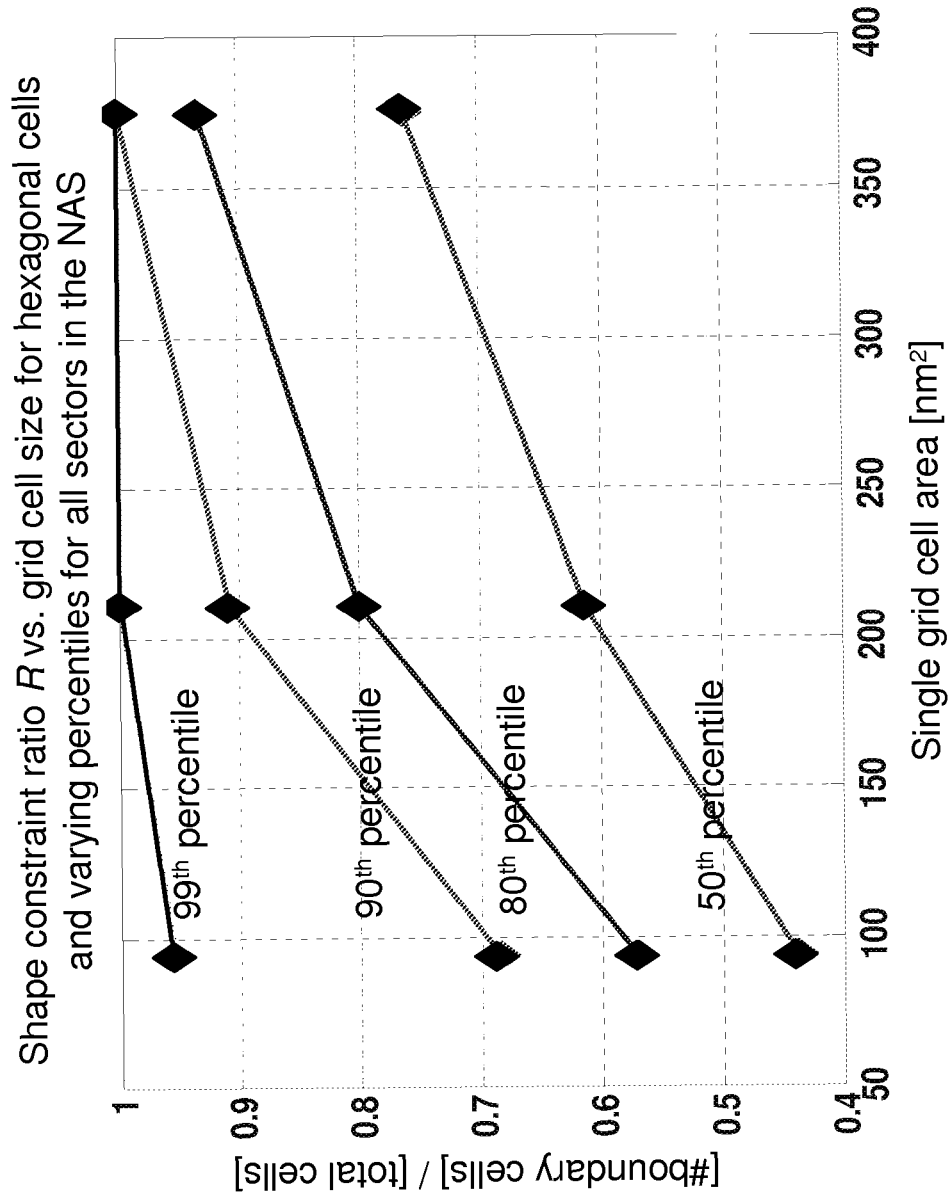
FIG. 24 illustrates the shape constraint ratio R versus grid cell size for hexagonal cells and varying percentiles over sectors in the NAS.

Lookup tables are used to find the limiting ratio R, most likely for the 99th percentile of a given sector size and shape. The corresponding lookup tables for possible hex cell sizes and sectors from which they are derived are given in tables in FIG. 23. The corresponding percentile curves are also presented in FIG. 24. The same calculation can be done to produce lookup tables for varying grid cell shapes and sizes, such as rectangles.

To measure the shape ratio inside the MIP model, the boundary and non-boundary cells may be explicitly defined. Therefore, the assignment of cells to seeds may be expressed within the MIP framework. For the 3-D model, binary variables $x_i^k$ and multi-commodity network flow models are defined. Let $x_i^k=1$ if cell i is assigned to seed k and $x_i^k=0$ otherwise. Given the constraints and variables required to set up a multi-commodity network flow model, boundary designator variables are expressed.

Let $b_i^k$ be a binary variable over all cells i∈I and seeds k∈K. Consider the following constraints:

$$\sum_{j \in N(i)} x_j^k + b_i^k \leq |N(i)| \quad \forall\, i \in I, k \in K \quad (20)$$

$$|N(i)| \leq \sum_{j \in N(i)} x_j^k + |N(i)| b_i^k \quad \forall\, i \in I, k \in K \quad (21)$$

where N(i) denotes the set of neighboring cells to cell i and operator | | denotes the cardinal number of a set. Constraints (20) state that if $$\sum_{j \in N(i)} x_j^k = |N(i)|$$

then $b_i^k$ has to be 0. For all values other than |N(i)| this constraint is Null. In other words, if all neighbors of cell i are assigned to a same seed k (meaning i is an interior cell of sector k) then $b_i^k=0$.

Constraint (21) states that if $$\sum_{j \in N(i)} x_j^k \leq |N(i)| - 1$$

then $b_i^k$ has to be 1. For $$\sum_{j \in N(i)} x_j^k = |N(i)|$$

this constraint is Null. There are two cases that $$\sum_{j \in N(i)} x_j^k \leq |N(i)| - 1$$

hold true: 1) when i is assigned to k and there exists at least one neighbor of i that is not assigned to k; 2) when neither i nor any of its neighbors are assigned to k. In the former case i is located at the boundary of k and the latter case means that i is assigned to a sector other than k.

Figure 25:
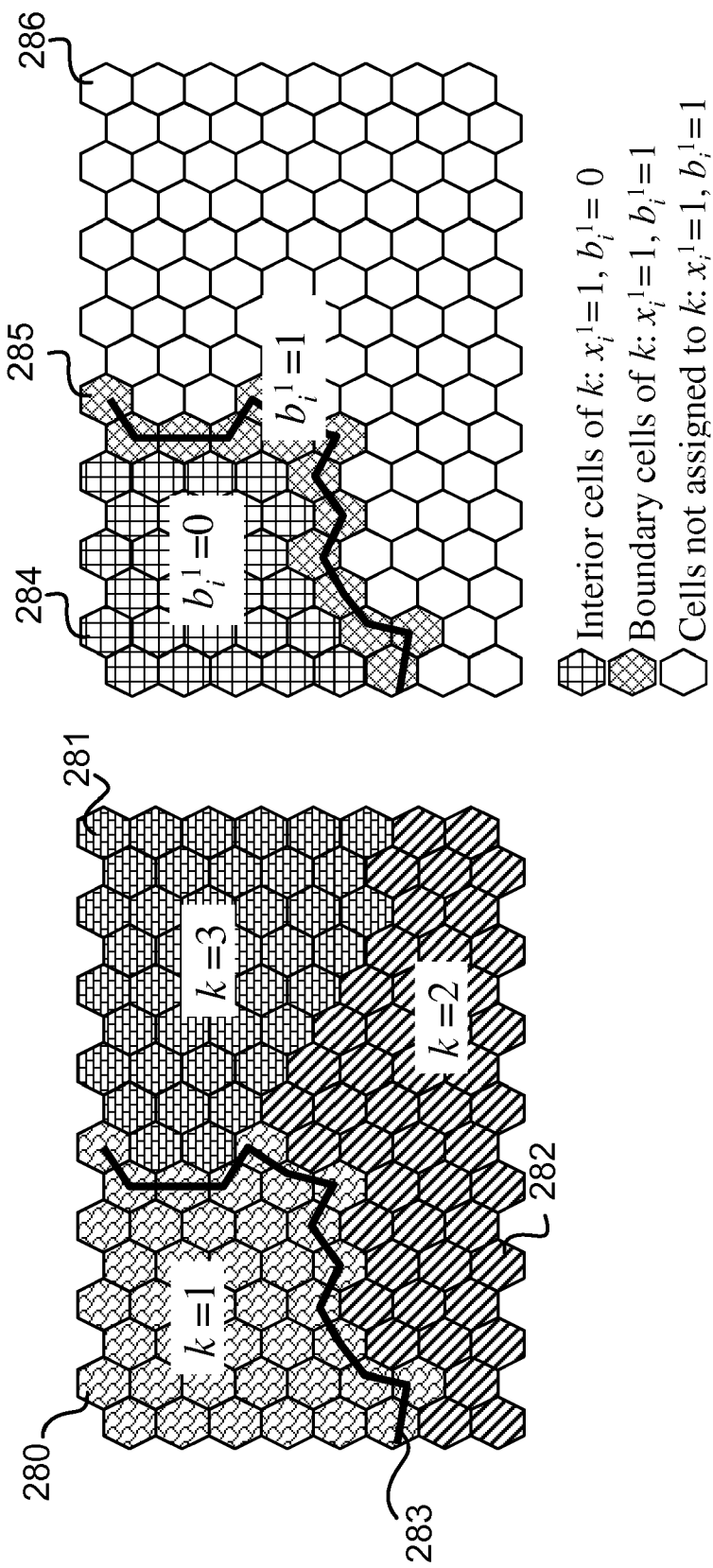
FIG. 25 presents the process for defining the cell boundary designator variables.

Together constraints (21) and (22) define binary variables $b_i^k$ for all cells that is 0 if a cell i is an interior (non-boundary) cell of sector k and is 1 for all other cells in the problem. These constraints are illustrated in FIG. 25. In this figure, cells belong to 3 different sectors: k=1 (280), k=2 (281), and k=3 (282) and the boundary between sector 1 and sectors 2 and 3 is designated by line (283). Thus, as illustrated in right-hand side of FIG. 25, the binary variable $b_i^k=0$ for all interior cells in sector 1, and $b_i^k=1$ for both boundary cells of k (285) and for cells assigned to other sectors than k (286).

The number of boundary cells can be computed as follows. The summation $$\sum_i x_i^k$$

indicates the number of cells that are assigned to sector k, so $$\left(|I| - \sum_i x_i^k\right)$$

is the total number of cells that are not assigned to sector k, where |I| is total number of cells in the problem. Now total number of boundary cells in a sector k can be computed as:

$$\sum_i b_i^k - \left(|I| - \sum_i x_i^k\right).$$

Finally, the ratio of number of boundary to non-boundary cells (R) can be calculated as:

$$R = \frac{\text{number of boundary cells}}{\text{total number of cells within a sector}} = \frac{\sum_i b_i^k - \left(|I| - \sum_i x_i^k\right)}{\sum_i x_i^k}$$

Within the model we constraint this ratio to be less than an admitted maximum value, $R^{max}$:

$$\frac{\sum_i b_i^k - \left(|I| - \sum_i x_i^k\right)}{\sum_i x_i^k} \leq R^{max} \quad (22)$$

$$\sum_i b_i^k - \left(|I| - \sum_i x_i^k\right) \leq R^{max} \sum_i x_i^k$$

$$\sum_i b_i^k + \sum_i x_i^k (1 - R^{max}) \leq |I|$$

Constraints (22) are linear, and $R^{max} \geq 0$ is the maximum value for a sector's perimeter-to-area ratio. Proper values for $R^{max}$ can be selected from lookup tables similar to those provided in FIG. 23. Adding constraints (20), (21), and (22) to the 2-D sectorization model result in sectors that satisfy shape requirements.

Now we present an example of sectorization for high-altitude Dulles Forth Worth (ZFW) and compare the optimality of sectors computed using our methodology to existing sector. For that we performed detailed simulation of aircraft movement and computed controller workload for both existing and optimized sectors within ZFW. Available simulation models to perform such analysis include Reorganized ATC Mathematical Simulator (RAMS), NASA's Future Airspace Concept Evaluation Tool (FACET), and Total Airport and Airspace Modeler (TAAM). For the embodiments presented here, the RAMS model is used to compute workload metrics.

Figure 26:
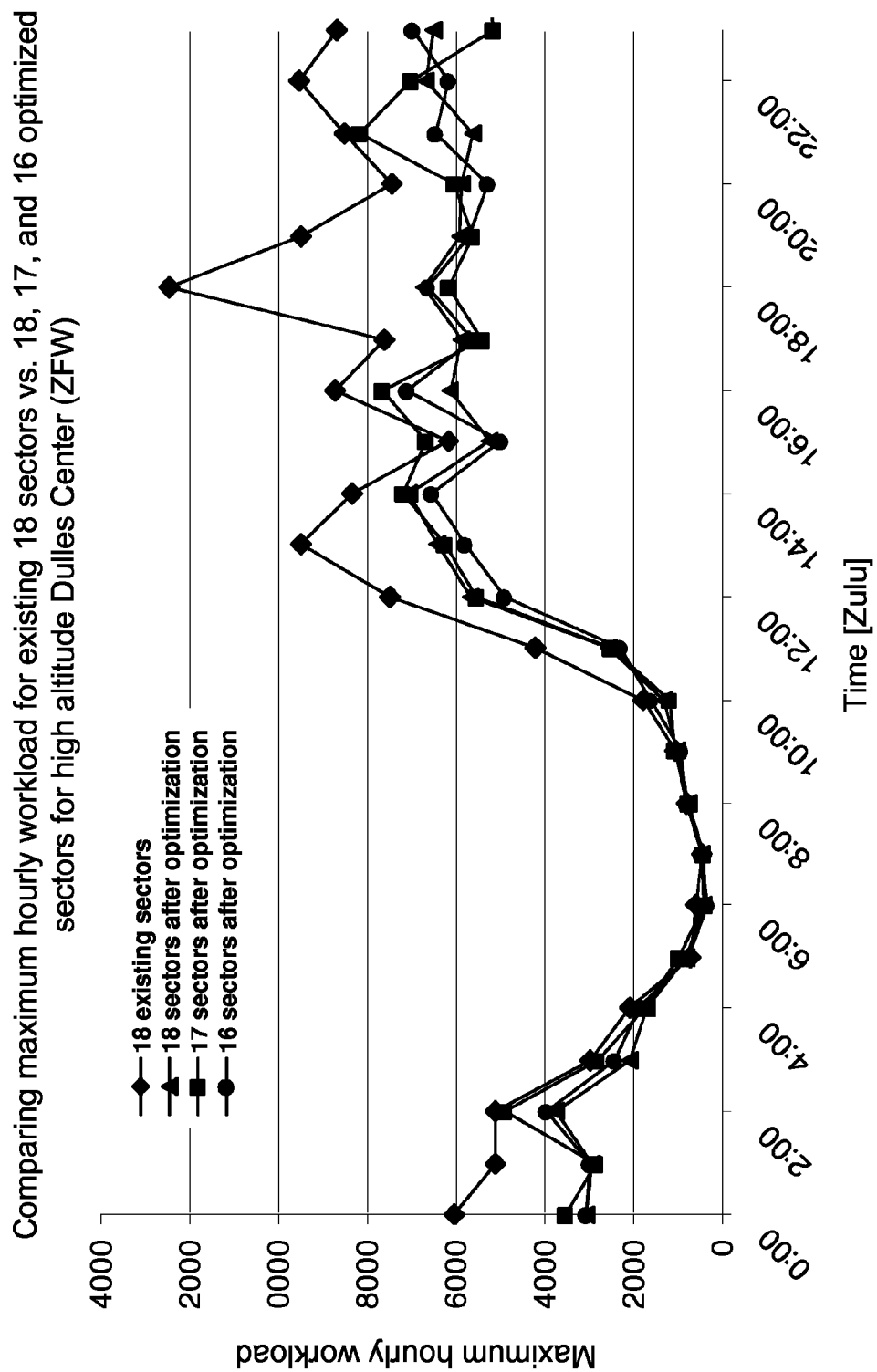
FIG. 26 presents results of post-design analysis of workload for high-altitude Dulles Center (ZFW) for 18 existing sectors and for 18, 17, and 16 optimized sectors.

Historical flight tracks are taken from the Dallas-Forth Worth (ZFW) high-altitude airspace. There are currently 18 sectors in this airspace. Optimization is run for 16, 17, and 18 sectors. The RAMS model is used to measure the workload for each of these optimal designs, and also for the 18 existing sectors. FIG. 26 compares the maximum hourly workload for the current 18 sectors vs. 18, 17, and 16 optimized sectors. Intuitively, one expects that reducing the number of sectors in this airspace would increase the maximum workload per sector. However, as depicted in the figure, controllers working in 16 optimized sectors will experience less workload than in the current 18. In other words, the optimization not only reduces the number of sectors, but also decreases workload per each sector. Note that the workload is balanced among sectors, and small workload variations are observed in FIG. 26.

While the previous examples apply to air traffic, the embodiment can be applied to many other domains. Examples include balancing the amount of sales across market districts, or balancing number of Democratic or Republican voters across jurisdictional districts. Other examples include reducing or minimizing the flow of goods or commodities across adjacent districts, or partitioning a wildlife refuge such that the migration of animals between partitions is minimized.

Various embodiment of this invention represent a solution to a class of problems known as partitioning or clustering. This class of problems, and the solution embodied in this invention, appears in many other disciplines. Examples include to waste water management, water resource management, facility location assignment, sales area assignments, telecommunication and tower location assignments, business location, jurisdictional boundary design, general site selection, and service area coverage.

In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on examples for partitioning airspace. However, one skilled in the art will recognize that embodiments of the invention could be equally applied to waste water management, water resource management, facility location assignment, sales area assignments, telecommunication and tower location assignment, business location, jurisdictional boundary design, general site selection, service area coverage, and airspace design.

An important embodiment of this invention includes slicing or partitioning the airspace into smaller pieces called air traffic control sectors or centers. An embodiment including an airspace design is presented; however the application of the invention in other domains is not excluded.

In addition, it should be understood that any figures which highlight the functionality and advantages are presented for example purposes only. The disclosed architecture is sufficiently flexible and configurable such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

I claim:

1. A tangible computer readable media containing a series of instructions that when executed by one or more processors performs a process for partitioning a selected area into a predetermined number of contiguous partitions comprising:
   a. decomposing said selected area into a plurality of cells;
   b. computing a supply value for each of said plurality of cells;
   c. creating a network structure by connecting each of said plurality of cells to each of its neighboring cells by a plurality of bi-directional arcs, each of said bi-directional arcs is assigned:
      i. a cell commonality value configured to represent demand similarities between two adjacent cells; and
      ii. a flow variable configured to represent a cumulative supply value transferred between adjacent cells for each direction;
   d. selecting a subset of said plurality of cells to be a plurality of seeds, each of said plurality of seeds is assigned a demand variable;

e. creating an optimization program to cluster said plurality of cells into said predetermined number of contiguous partitions including:
  i. calculating a total partition demand for each of said predetermined number of contiguous partitions as the summation of said supply value of cells clustered into each of said predetermined number of contiguous partitions;
  ii. developing an objective function that prioritizes said plurality of bi-directional arcs relative to their said cell commonality value; and
  iii. developing a set of constraints including:
    1. creating said predetermined number of contiguous partitions;
    2. applying flow conservation constraints to each of said plurality of cells;
    3. limiting said total partition demand of each of said predetermined number of contiguous partitions to be smaller than a first predetermined value; and
    4. for each of said plurality of cells, restricting only one of outflow variables to be non-zero;
f. solving said optimization program to determine:
  i. the value for said flow variable for each of said plurality of bi-directional arcs;
  ii. a plurality of open seeds, each of said plurality of open seeds representing one partition; and
  iii. said total partition demand for each of said predetermined number of contiguous partitions; and
g. creating partition boundaries for each of said plurality of open seeds by:
  i. creating an updated plurality of bi-directional arcs by eliminating arcs in said plurality of bi-directional arcs that their said flow variable is determined by said optimization program to be equal to zero;
  ii. grouping cells in said plurality of cells when they are connected to each other via one of said updated plurality of bi-directional arcs into a plurality of cell clusters; and
  iii. merging cells within each of said plurality of cell clusters to create said predetermined number of contiguous partitions.

2. The process of claim 1, wherein said supply value of each of said plurality of cells is determined using one of the following parameters:
  a. a cell traffic load;
  b. a cell traffic complexity;
  c. a cell workload;
  d. a cell radar traffic hit;
  e. a cell population;
  f. a cell concentration of goods; and
  g. a combination of the above.

3. The process of claim 1, wherein said optimization program is a mixed integer program.

4. The process of claim 1, further including a process for smoothing the boundaries of said predetermined number of contiguous partitions.

5. The process of claim 1, wherein at least two of said plurality of cells are grouped to form a larger cells before execution of said process for partitioning said selected area.

6. The process of claim 1, further including a set of constraints for restricting the ratio of perimeter to surface area of each of said predetermined number of contiguous partitions to a second predetermined value.

7. The process of claim 1, wherein said commonality metric is calculated using the number of vehicles transferred between two adjacent cells connected by said plurality of bi-directional arcs.

8. The process of claim 1, wherein said commonality metric is calculated using similarity of traffic direction within two adjacent cells connected by said plurality of bi-directional arcs.

9. The process of claim 1, wherein said objective function includes the ratio of said flow values to said cell commonality metric summed over all said plurality of bi-directional arcs in said network structure.

10. The process of claim 1, wherein selection of said plurality of seeds includes one of the following methods:
  a. selecting each of said plurality of cells to be a seed;
  b. selecting said plurality of seeds in a regular grid from said plurality of cells;
  c. selecting said plurality of seeds based on supply value for each of said plurality of cells;
  d. selecting said plurality of seeds based on geographical location of points of interest; and
  e. selecting said plurality of seeds based on a random selection from said plurality of cells.

11. A tangible computer readable media containing a series of instructions that when executed by one or more processors performs a process for partitioning a selected volume into a predetermined number of contiguous 3-dimensional partitions comprising:
  a. decomposing said selected volume into a plurality of 3-dimensional cells;
  b. computing a supply value for each of said plurality of 3-dimensional cells;
  c. creating a network structure by connecting each of said plurality of 3-dimensional cells to each of its horizontal or vertical neighboring 3-dimensional cells by a plurality of bi-directional arcs, each of said bi-directional arcs is assigned:
    i. a cell commonality value configured to represent demand similarities between two adjacent 3-dimensional cells; and
    ii. a flow variable configured to represent a cumulative supply value transferred between adjacent 3-dimensional cells for each direction; and
  d. selecting a subset of said plurality of 3-dimensional cells to be a plurality of seeds, each of said plurality of seeds is assigned a demand variable;
  e. creating an optimization program to cluster said plurality of 3-dimensional cells into said predetermined number of contiguous 3-dimensional partitions including:
    i. calculating a total partition demand for each of said predetermined number of contiguous 3-dimensional partitions as the summation of said supply value of 3-dimensional cells clustered into each of said predetermined number of contiguous 3-dimensional partitions;
    ii. developing an objective function that prioritizes said plurality of bi-directional arcs relative to their said cell commonality value; and
    iii. developing a set of constraints including:
      1. creating said predetermined number of contiguous 3-dimensional partitions;
      2. applying flow conservation constraints to each of said plurality of 3-dimensional cells;
      3. limiting said total partition demand of each of said predetermined number of contiguous 3-dimensional partitions to be smaller than a first predetermined value;
      4. for each of said plurality of 3-dimensional cells, restricting only one of outflow variables to be non-zero; and 5. restricting each of said predetermined number of contiguous 3-dimensional partitions to be a right prism wherein its joining edges and faces are perpendicular to the base faces;
f. solving said optimization program to determine:
i. the value for said flow variable for each of said plurality of bi-directional arcs;
ii. a plurality of open seeds, each of said plurality of open seeds representing one 3-dimensional partition; and
iii. said total partition demand for each of said predetermined number of contiguous 3-dimensional partitions; and
g. creating partition boundaries for each of said plurality of open seeds by:
i. creating an updated plurality of bi-directional arcs by eliminating arcs in said plurality of bi-directional arcs that their said flow variable is determined by said optimization program to be equal to zero;
ii. grouping 3-dimensional cells in said plurality of 3-dimensional cells when they are connected to each other via one of said updated plurality of bi-directional arcs into a plurality of 3-dimensional cell clusters; and
iii. merging 3-dimensional cells within each of said plurality of 3-dimensional cell clusters to create said predetermined number of contiguous 3-dimensional partitions.

12. The process of claim 11, wherein said supply value of each of said plurality of 3-dimensional cells is determined using one of the following parameters:
a. a cell traffic load;
b. a cell traffic complexity;
c. a cell workload;
d. a cell radar traffic hit;
e. a cell population;
f. a cell concentration of goods; and
g. a combination of the above.

13. The process of claim 11, further including a process for smoothing the boundaries of said predetermined number of contiguous partitions.

14. A partitioning system for partitioning a selected area into a predetermined number of contiguous partitions comprising:
a. a decomposer module, said decomposer module decomposing said selected area into a plurality of cells;
b. a supply computation module, said supply computation module computing a supply value for each of said plurality of cells;
c. a network structure setup module, said network structure setup module creating a network structure by connecting each of said plurality of cells to each of its neighboring cells by a plurality of bi-directional arcs, each of said bi-directional arcs is assigned:
i. a cell commonality value configured to represent demand similarities between two adjacent cells; and
ii. a flow variable configured to represent a cumulative supply value transferred between adjacent cells for each direction;
d. a seed selection module, said seed selection module selecting a subset of said plurality of cells to be a plurality of seeds, each of said plurality of seeds is assigned a demand variable;
e. an optimization setup module, said optimization setup module creating an optimization program to cluster said plurality of cells into said predetermined number of contiguous partitions including:
i. calculating a total partition demand for each of said predetermined number of contiguous partitions as the summation of said supply value of cells clustered into each of said predetermined number of contiguous partitions;
ii. developing an objective function that prioritizes said plurality of bi-directional arcs relative to their said cell commonality value; and
iii. developing a set of constraints including:
1. creating said predetermined number of contiguous partitions;
2. applying flow conservation constraints to each of said plurality of cells;
3. limiting said total partition demand of each of said predetermined number of contiguous partitions to be smaller than a first predetermined value; and
4. for each of said plurality of cells, restricting only one of outflow variables to be non-zero;
f. a solver module, said solver module solving said optimization program to determine:
i. the value for said flow variable for each of said plurality of bi-directional arcs;
ii. a plurality of open seeds, each of said plurality of open seeds representing one partition; and
iii. said total partition demand for each of said predetermined number of contiguous partitions; and
g. a boundary creation module, said boundary creation module creating partition boundaries for each of said plurality of open seeds by:
i. creating an updated plurality of bi-directional arcs by eliminating arcs in said plurality of bi-directional arcs that their said flow variable is determined by said optimization program to be equal to zero;
ii. grouping cells in said plurality of cells when they are connected to each other via one of said updated plurality of bi-directional arcs into a plurality of cell clusters; and
iii. merging cells within each of said plurality of cell clusters to create said predetermined number of contiguous partitions.

15. The partitioning system of claim 14, wherein said optimization program is a mixed integer program.

16. The partitioning system of claim 14, wherein said supply value of each of said plurality of cells is determined using one of the following parameters:
a. a cell traffic load;
b. a cell traffic complexity;
c. a cell workload;
d. a cell radar traffic hit;
e. a cell population; and
f. a cell concentration of goods.

17. The partitioning system of claim 14, further including a set of constraints for restricting the ratio of perimeter to surface area of each of said predetermined number of contiguous partitions to a second predetermined value.

18. The partitioning system of claim 14, wherein said commonality metric is calculated using number of vehicles transferred between two adjacent cells connected by said plurality of bi-directional arcs.

19. The partitioning system of claim 14, wherein said commonality metric is calculated using similarity of traffic direction within two adjacent cells connected by said plurality of bi-directional arcs.

20. The partitioning system of claim 14, wherein selection of said plurality of seeds includes one of the following methods:
a. selecting each of said plurality of cells to be a seed;
b. selecting said plurality of seeds in a regular grid from said plurality of cells;

c. selecting said plurality of seeds based on supply value for each of said plurality of cells;
d. selecting said plurality of seeds based on geographical location of points of interest; and
e. selecting said plurality of seeds based on a random selection from said plurality of cells.

21. A tangible computer readable media containing a series of instructions that when executed by one or more processors performs a process for partitioning a selected area into a plurality of contiguous partitions comprising:
   a. decomposing said selected area into a plurality of cells;
   b. creating a network structure by connecting each of said plurality of cells to each of its neighboring cells by two directional arcs, said two directional arcs are in opposite directions;
   c. for each of said plurality of cells, selecting only one of outward directional arcs connecting each of said plurality of cells to its neighbors based on a set of predetermined criteria; wherein an outward directional arc is an arc with direction outward the cell;
   d. creating partition boundaries by:
      i. creating an updated plurality of directional arcs by eliminating arcs in said plurality of outward directional arcs that are not selected;
      ii. grouping cells in said plurality of cells when they are connected to each other via one of said updated plurality of directional arcs into a plurality of cell clusters; and
      iii. merging cells within each of said plurality of cell clusters to create said plurality of contiguous partitions.

22. The partitioning process of claim 21, wherein each of said directional arcs is assigned a cost value.

23. The partitioning process of claim 22, wherein said cost value is determined based on a cell commonality value configured to represent demand similarities between two adjacent cells.

24. The partitioning process of claim 23, wherein said set of predetermined criteria is calculated using said cell commonality value of at least one of said directional arcs.

25. A tangible computer readable media containing a series of instructions that when executed by one or more processors performs a process for partitioning a selected area into a plurality of contiguous partitions comprising:
   a. decomposing said selected area into a plurality of cells;
   b. creating a network structure by connecting each of said plurality of cells to each of its neighboring cells by plurality of arcs;
   c. creating partition boundaries by:
      i. creating an updated plurality of arcs by eliminating a subset of said plurality of arcs based on a set of predetermined criteria;
      ii. grouping cells in said plurality of cells when they are connected to each other via one of said updated plurality of arcs into a plurality of cell clusters; and
      iii. merging cells within each of said plurality of cell clusters to create said plurality of contiguous partitions.

26. The partitioning process of claim 25, wherein each of said arcs is assigned a cost value.

27. The partitioning process of claim 26, wherein said cost value is determined based on a cell commonality value configured to represent demand similarities between two adjacent cells.

28. The partitioning process of claim 27, wherein said set of predetermined criteria is calculated using said cell commonality value of at least one of said arcs.

* * * * *